(12) United States Patent
Klein et al.

(10) Patent No.: US 8,594,298 B2
(45) Date of Patent: Nov. 26, 2013

(54) CALL MANAGEMENT

(75) Inventors: Mark D. Klein, Los Altos, CA (US);
Michael Scott Manzo, San Francisco, CA (US); Tamara Hills Mahmood, Cupertino, CA (US); Andrew M. Maurer, San Jose, CA (US); Michael J. Kolbly, Milpitas, CA (US); Ronald D. Stelter, San Ramon, CA (US); Douglas L. Brackbill, Aptos, CA (US)

(73) Assignee: Avaya Inc., Basking Ridge, NJ (US)

( * ) Notice: Subject to any disclaimer, the term of this patent is extended or adjusted under 35 U.S.C. 154(b) by 2462 days.

(21) Appl. No.: 11/060,232

(22) Filed: Feb. 16, 2005

(65) Prior Publication Data
US 2005/0201362 A1 Sep. 15, 2005

Related U.S. Application Data

(60) Provisional application No. 60/546,409, filed on Feb. 20, 2004.

(51) Int. Cl.
*H04M 3/42* (2006.01)

(52) U.S. Cl.
USPC ............ 379/211.02; 379/212.01; 379/221.01; 455/417

(58) Field of Classification Search
USPC ............. 379/211.02, 201.01, 220.01, 221.01; 455/417
See application file for complete search history.

(56) References Cited

U.S. PATENT DOCUMENTS

| | | | |
|---|---|---|---|
| 4,790,003 A * | 12/1988 | Kepley et al. | 379/88.18 |
| 5,329,578 A | 7/1994 | Brennan et al. | |
| 5,793,859 A | 8/1998 | Matthews | |
| 5,802,160 A | 9/1998 | Kugell et al. | |
| 5,848,142 A | 12/1998 | Yaker | |
| 5,857,013 A * | 1/1999 | Yue et al. | 379/88.2 |
| 6,094,574 A * | 7/2000 | Vance et al. | 455/415 |
| 6,151,507 A * | 11/2000 | Laiho et al. | 455/466 |
| 6,246,871 B1 * | 6/2001 | Ala-Laurila | 455/413 |
| 6,343,121 B1 * | 1/2002 | Infosino | 379/215.01 |
| 6,381,320 B1 * | 4/2002 | Creamer et al. | 379/201.01 |
| 6,385,584 B1 * | 5/2002 | McAllister et al. | 704/275 |
| 6,389,114 B1 * | 5/2002 | Dowens et al. | 379/52 |
| 6,466,783 B2 * | 10/2002 | Dahm et al. | 455/414.2 |
| 6,574,319 B2 * | 6/2003 | Latter et al. | 379/142.07 |
| 6,574,470 B1 * | 6/2003 | Chow et al. | 455/417 |

(Continued)

FOREIGN PATENT DOCUMENTS

CA 2407801 A1 5/2003

OTHER PUBLICATIONS

Notification of Transmittal of the International Search Report or the Declaration, PCT/US05/05307, May 29, 2005, 4 pages.
Written Opinion of the International Searching Authority, PCT/US05/05307, Jun. 16, 2005, 17 pages.

(Continued)

*Primary Examiner* — MD S Elahee
(74) *Attorney, Agent, or Firm* — Kacvinsky Daisak PLLC; John Maldjian, Esq.; Alexander D. Walter, Esq.

(57) ABSTRACT

A personal call management system allows a user to specify how incoming telephone calls should be handled. The user can specify various parameters including modes, filters, schedules, and the like. Incoming calls are routed to a specified telephone number, or sent to voicemail, or otherwise disposed of. Users can change modes manually or can specify automatic mode selection based on time of date, day of week, location, and/or other factors.

33 Claims, 20 Drawing Sheets

(56) References Cited

U.S. PATENT DOCUMENTS

| | | | |
|---|---|---|---|
| 6,631,186 B1* | 10/2003 | Adams et al. | 379/201.12 |
| 6,768,792 B2* | 7/2004 | Brown et al. | 379/207.14 |
| 6,845,155 B2* | 1/2005 | Elsey | 379/266.04 |
| 7,330,721 B2* | 2/2008 | Bhatia et al. | 455/422.1 |
| 2002/0172347 A1* | 11/2002 | Elsey | 379/221.01 |
| 2003/0161459 A1* | 8/2003 | McBlain et al. | 379/220.01 |
| 2004/0028208 A1* | 2/2004 | Carnazza et al. | 379/221.01 |

OTHER PUBLICATIONS

Hyam, Kristy, "CA Application No. 2,556,892 Office Action Dec. 7, 2010", , Publisher: CIPO, Published in: CA.

Nash, Michael, "EP Application No. 05723332.2 Supplementary Search Report Apr. 12, 2011", , Publisher: EPO, Published in: EP.

Canadian Patent Application No. 2,556,892, "Call Management," Avaya Integrated Cabinet Solutions, Inc., Office Action dated Sep. 21, 2011, 4 pages.

* cited by examiner

CALL MANAGEMENT: EASY CALL DELUXE     Step 1

How to Set it up

Step 1: Set Up Your Phones

Step 2: Set Up Your Call Manager

Step 3: Verification

Phone Set Up
Enter your phones and phone numbers so you calls are managed

Phone Set Up: Home phone: [650] [988] [1616] — 201A
Call management includes personal Voice mailbox for you. You may also add separate family Voice Mailbox ($1.99/month)
☐ Add a Family Voice Mailbox ($1.99/month)

Mobile phone: 650-714-2375 — 201B

Office phone: [408] [254] [2416] — 201C

Office phone (second homeline for business, vacation home, etc.)
Description: [None ▼] — 203    Number: [  ] — 201D
                                         202

☐ Block callers without caller ID — 204
☑ Enable my VIP List
VIP's can always get a hold of you in case of emergency. Enter names and phone numbers in the VIP List manager (you can do this later).
VIP List manager... — 205

Email address for call notification    [mklein@neubond.com] — 206
Email Address for receiving voicemail  [mark.klein@neubond.com] — 207

Click Continue to move on, or Previous to go back

[Previous] [Continue] — 209
         208

| UserRuleID | userID | tag | UserStatusID | ruleRank | UserManagedAddress ID | filterType | CallerGroupID | OpcodeID | DeliveryDeviceID1 | DeliveryDeviceID2 | callNotifyEmailOption | callNotifySMSOption |
|---|---|---|---|---|---|---|---|---|---|---|---|---|
| 11756 | 643 | DEFAULT | | 1 | 1000 | 1 DONT_CARE | | 4 | 1 | | 1N | 1Y |
| 11757 | 643 | TELEMARKETERS | | 1 | 10 | 1 NO_CID | | 5 | 1 | | 1N | 1Y |
| 11758 | 643 | SUBSTITUTE | 4230 | 1 | 20 | 1 DONT_CARE | | 1 | 1816 | | 1Y | 1Y |
| 11759 | 643 | SCREEN_SUBSTITUTE | 4231 | 1 | 20 | 1 DONT_CARE | | 3 | 1816 | | 1Y | 1Y |
| 11760 | 643 | SCREEN_SUBSTITUTE_VIP_ACTION | 4231 | 1 | 19 | 1 FILTER | 306 | 1 | 1816 | | 1N | 1Y |
| 11761 | 643 | UNAVAILABLE_HOME_ACTION | 4232 | 1 | 20 | 1096 DONT_CARE | 1 | 2 | 1 | | 1N | 1Y |
| 11762 | 643 | UNAVAILABLE_MOBILE_ACTION | 4232 | 1 | 200 | 1095 DONT_CARE | 1 | 2 | 1 | | 1Y | 1Y |
| 11765 | 643 | HOME_AVAILABLE_HOMER_ACTION | 4233 | 1 | 200 | 1096 DONT_CARE | 1 | 1 | 1 | | 1N | 1Y |
| 11766 | 634 | HOME_AVAILABLE_MOBILE_ACTION | 4233 | 1 | 200 | 1095 DONT_CARE | 1 | 2 | 1813 | | 1Y | 1Y |
| 11769 | 643 | HOME_SCREEN_HOME_ACTION | 4234 | 1 | 200 | 1096 DONT_CARE | 1 | 3 | 1813 | | 1Y | 1Y |
| 11770 | 643 | HOME_SCREEN_MOBILE_ACTION | 4234 | 1 | 200 | 1095 DONT_CARE | 1 | 1 | 1813 | | 1Y | 1Y |
| 11771 | 643 | N | 4234 | 1 | 99 | 1095 FILTER | 306 | 1 | 1812 | | 1Y | 1Y |
| 11776 | 643 | MOBILE_AVAILABLE_HOME_ACTION | 4235 | 1 | 200 | 1096 DONT_CARE | 1 | 2 | 1 | | 1Y | 1Y |
| 11777 | 643 | N | 4235 | 1 | 200 | 1095 DONT_CARE | 1 | 1 | 1 | | 1Y | 1Y |
| 11809 | 643 | USER0_HOME_ACTION | 4251 | 1 | 200 | 1096 DONT_CARE | 1 | 2 | 1 | | 1N | 1Y |
| 11810 | 643 | USER0_HMOBILE_ACTION | 4251 | 1 | 200 | 1095 DONT_CARE | 1 | 2 | 1 | | 1N | 1Y |
| 11811 | 643 | USER0_OFFICE_ACTION | 4251 | 1 | 200 | 1097 DONT_CARE | 1 | 2 | 1 | | 1N | 1N |
| 11812 | 643 | USER0_OTHER_ACTION | 4251 | 1 | 200 | 1098 DONT_CARE | 1 | 2 | 1 | | 1N | 1N |

FIG. 17  ← 1700

Your currently active profile is At Office

| Your Profiles | Which profile to use | Calls to Home from <family> | Calls to Home from <friends> | Other Calls to Home with CID | Other Calls to Home No CID | Calls to Office | Calls to Wireless | * Call notification |
|---|---|---|---|---|---|---|---|---|
| At Home | Use GPS ▼ | Home | Home | Home | Home | Office | Home | Home e-mail |
| At Office | M-F 8-5 ▼ Update / Custom | Caller choice Home Office | Home | Home | Home | Office | Office | Office e-mail |
| In Meeting | Next 15 minutes ▼ Submit | Caller choice Home Wireless | Home | Home | Home | Office | Wireless | Office e-mail |
| On The Go | Next hour ▼ Submit | Wireless | Wireless | Home | Home | Wireless | Wireless | None |
| On Vacation | On Off | Wireless | Wireless | Home | Home | Wireless | Wireless | None |

Switch to At Home ▼ profile until 3 pm ▼ Submit

Edit Profiles

Edit Phones

Profiles can also be selected from the wireless phone

FIG. 19

CALL MANAGEMENT

CROSS-REFERENCE TO RELATED APPLICATIONS

This application claims priority from U.S. Provisional Application No. 60/546,409 entitled "Personal Call Management System," filed Feb. 20, 2004, the disclosure of which is incorporated herein by reference.

This application is related to U.S. patent application Ser. No. 11/060,642 entitled "Dynamically Routing Telephone Calls," filed on the same date herewith, the disclosure of which is incorporated herein by reference.

This application is related to U.S. patent application Ser. No. 11/060,085 entitled "Informing Caller of Callee Activity Mode," filed on the same date herewith, the disclosure of which is incorporated herein by reference.

BACKGROUND OF THE INVENTION

1. Field of the Invention

This invention relates generally to management of communications such as telephone calls, and more specifically to techniques for handling, routing, and configuring incoming telephone calls.

2. Background of the Invention

Many people (callees) have a multitude of telephone numbers (TNs) that they give out to potential callers. Typically this set of TNs includes home, office, and cell phone numbers. If the caller knows more than one TN for the callee, the caller selects the most likely number to reach the callee and often leaves a voicemail message before trying another number. The caller is burdened with determining the most likely sequence of calls to reach the callee. This often results in one or more voicemail messages (home, office, cell) even if the caller ultimately reaches the callee. This situation slows the process of establishing a connection, increases costs, and reduces the probability of making a live connection, due to the effort and time required of the caller. In addition, multiple voicemail messages are a burden for the callee.

What is needed is a system and method that automatically handles, routes, and manages telephone calls so that callers do not have to guess which number to call to reach a particular individual. What is further needed is a system and method that allows a callee to specify how incoming calls are handled, and that responds dynamically to real-time conditions at the time a call is placed. What is further needed is additional functionality that improves the process of configuring, routing, and processing incoming telephone calls.

SUMMARY OF THE INVENTION

The callee is often in a much better position to know how they can be reached than the caller, since the callee often knows in advance where they will be physically located (home, office, or car), and how reachable they will be. The present invention provides techniques for allowing the callee to specify how incoming calls will be handled. The user can specify call management parameters according to various factors, including time of day, day of week, manual override, caller identity, caller input (for example specifying whether the call is urgent), called number, location of callee (for example using GPS, cell phone tower location, tower triangulation, Instant Messaging presence, Smart Tags, or other locating technology), location of caller, recent phone use, explicit selection (using web page, cell phone application, dial-in Interactive Voice Response (IVR), or other method), implicit system-learned (adaptive) understanding of the callee's call-receipt desires, or the like. In addition, any combination of the above factors may be used.

Calls may also be sent to voicemail without ringing the user's phone, based upon filtering or explicit selection. Callees may configure their routing and filtering by behavior/location/activity mode. Example modes are: At Home, At Work, At Work in a Meeting, Commuting, and on Vacation. The selection of active mode can be made explicitly or implicitly. Explicit mode selection can include any combination of time-of-day and user input using cell phone, web, and/or phone IVR. For example, a cell phone may have a physical "mode" button or a mechanism for accessing an on-screen menu from which the user can select among a number of modes. Implicit mode selection can include location information (including velocity calculated from sequential position samples), computer calendaring information, past behavior of the user, and the location of other users ("suppress calls while I'm in the presence of the CEO"). Global Positioning System (GPS) technology may be used to route calls (based on mode); the destination telephone need not be equipped with GPS detection technology. For example, if the user is carrying a cell phone (or other location-aware device) and walks into his or her office, the mode may change to "At Office" and calls will be routed to the office phone.

Different ring types may be used based upon any combination of dialed TN, calling party, mode, caller location, callee location, and/or the like. For example, the specific ring of a user's home, office, or cell phone may be selected by the system based on whether the caller is a family member or business associate (filter based) or whether the caller originally called the home TN or office TN (dialed TN based).

The callee configures the system with mode and filter preferences, in order to define how various calls should be handled. Configuration can take place via any type of user interface, including a web interface, phone-based IVR, or cell phone application. Configuration includes characterizing potential callers into groups and setting up filters for each group. Filters specify either to which phone to send the call, to send it to voicemail, or to give the caller a choice. The filter configuration for a group can change based on time of day, explicit command from the user, and/or location of the user. Configuration also includes defining various activity modes during which different call management rules should be applied.

In one embodiment, the system can learn (adapt and extrapolate from past user behavior) in order to select current mode or to place calling TN into filters. This configuration can take place automatically by the system or the system can present suggestions to the user for approval. The system can, for example, learn not to take calls from party A when the callee is in the presence of party B.

In one embodiment, a call to any one of a callee's existing phone numbers is automatically routed to the callee at his or her designated phone. At the callee's discretion, certain callers will ring through and others will automatically go to a single voicemail box (or otherwise handled).

In another embodiment, location information from a cell phone carried by the callee can automatically change the user's filtering and/or activity mode throughout the day. For example, if the callee is within 20 feet of his or her office phone, the office phone is the phone that will ring for any, or some selected subset, of people calling the callee.

The system of the present invention provides any or all of the following features, alone or in any combination:
  multiple TNs for a single callee: the callee can specify different handling procedures for each TN;

a mechanism, such as a web-based user interface, for specifying and implementing call handling procedures that depend on any or all of a number of factors;

callee (and/or caller) location detection, for example using GPS or other techniques, for determining which call-handling mode to use;

time of day detection for determining which call-handling mode to use;

caller identification, for determining which call-handling mode to use;

adaptive techniques for learning callee preferences for call handling;

call forwarding to other phones or to voicemail or email;

call screening;

default modes for call-handling (for example, At Home, At Work, At Work in a Meeting, Commuting, On Vacation);

user interface for modifying and configuring call-handling modes;

automatic switching from one mode to another, for example when conditions, time period, location, or environmental factors change;

user-initiating switching from one mode to another, for example using cell phone commands, web-based interface, telephone IVR, or the like;

a user interface for specifying call handling settings and for changing modes.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

FIG. 2 is a screen shot depicting a telephone setup screen according to one embodiment.

FIG. 17 is a table containing an example set of rules for a callee, including a set of op-codes.

FIG. 19 is an example of a call routing matrix according to one embodiment.

DETAILED DESCRIPTION OF THE EMBODIMENTS

Terminology

Figure 1:
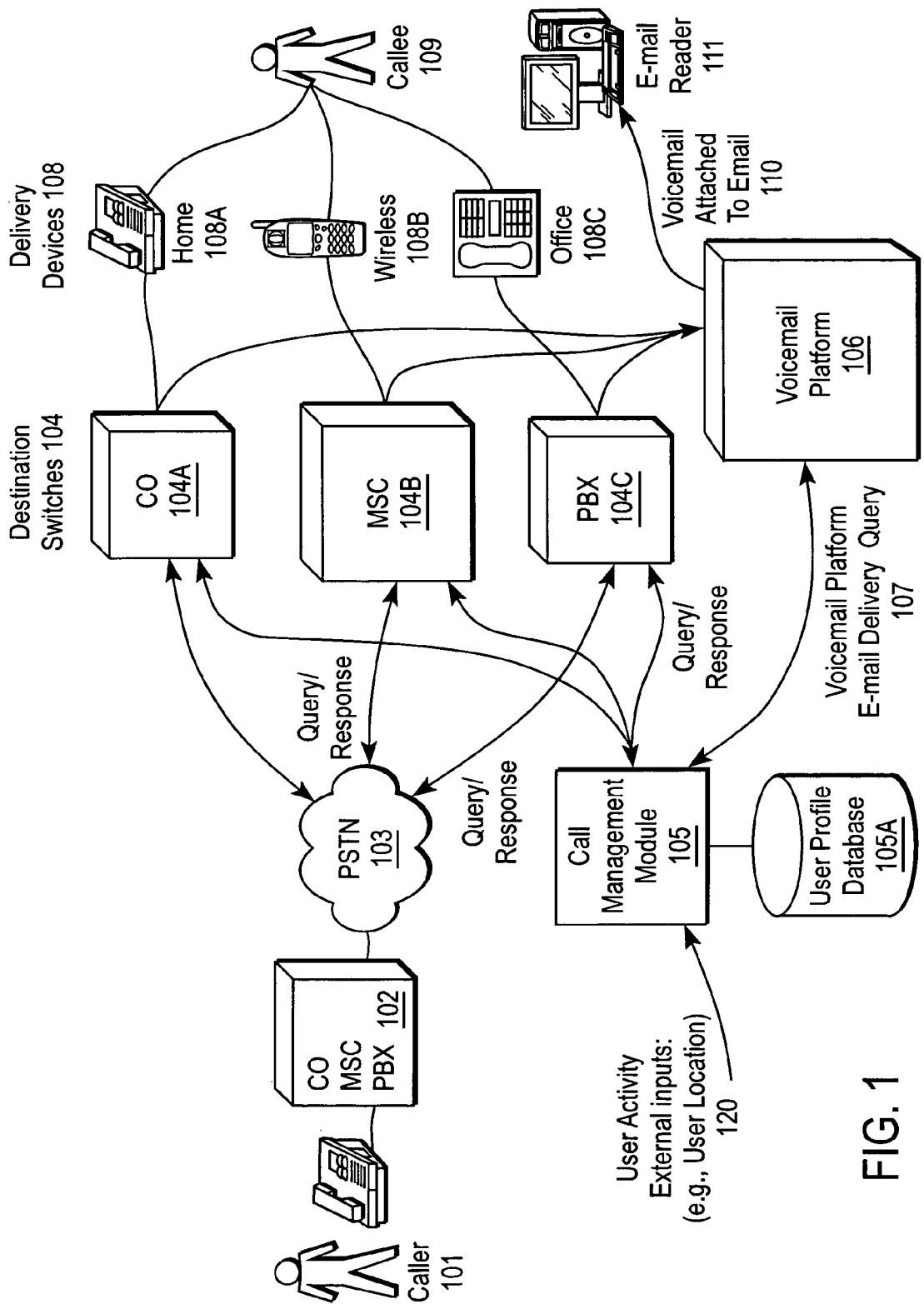
FIG. 1 is a block diagram depicting an architecture for implementing the present invention according to one embodiment.

For purposes of the description herein, the term "callee" is used to refer to an individual or entity that is being called or that may be called at some point in the future. The term "user" is used interchangeably with "callee."

A "caller" is a person who places a call to a user, or attempts to place a call, or potentially could place a call.

A "dialed telephone number (dialed TN)" is a number dialed by a caller. It may or may not be associated with an actual telephone device.

A "delivery telephone device" is a device that can be used to receive calls.

A "user profile" is a set of user configuration information specifying call management parameters.

A "mode" is a callee's operational mode, such as "At Home," "At Work," etc. As described below, a mode can be selected explicitly by a user or implicitly according to the user's profile.

A "filter" is a defined scheme for identifying a subset of a user's potential callers and to treat calls from them in a distinctive way.

Additional terminology is defined herein within the context of the following description.

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

For illustrative purposes, the following description sets forth the invention in terms of handling a call that is placed by dialing a telephone number (TN) such as a North American Numbering Plan (NANP) number. However, one skilled in the art will recognize that the techniques set forth herein can be used for handling communications that are initiated in other ways. In particular, a caller can specify a callee using any type of caller identifier, whether a dialed TN, a text string, a non-NANP digit sequence, or the like. The term User Address (UA) is used herein to denote any such mechanism for identifying a callee.

In the following description the term Delivery Telephone Number (Delivery TN) refers to the telephone number (or UA) of the device or system that terminates a call for, or to, a user. Delivery TNs connect to delivery devices such as a telephone, a voicemail platform (traditional or e-mail delivery only), attendant Interactive Voice Response (IVR) system, or the like. A Dialed TN (the TN that the caller dialed) may or may not have the same number as one of the callee's Delivery TNs; a call to the Dialed TN may or may not be connected to the device addressed by the identical Delivery TN. Thus, in some cases, a Dialed TN is virtual and is not the address of a physical delivery device.

As will be described in more detail below, in one embodiment the present invention manages a callee's set of UAs and the real-time mapping of those UAs to delivery devices. Calls placed to a UA may be routed to one (or more) of the delivery devices corresponding to Delivery TNs. The system uses a combination of modes, filters, caller selection (attendant), busy state, and no-answer state to determine whether and how a call should be routed to an appropriate delivery TN.

The present invention can be implemented in symmetric or asymmetric fashion. A symmetric implementation is one in which all delivery TNs are in the set of dialed TNs; otherwise the implementation is asymmetric.

Referring now to FIG. 1, there is shown a block diagram depicting an architecture for implementing the present invention according to one embodiment.

Caller 101 places a call via a local phone switch 102 such as Central Office (CO), Mobile Switching Center (MSC), or Private Branch Exchange (PBX). The call goes through public switched telephone network (PSTN) 103 to destination switch 104 such as CO 104A, MSC 104B, or PBX 104C. The present invention may be implemented regardless of the particular type of switches 102, 104 being used at the origin or destination. Destination switch 104 queries call management module 105 to determine where to route the call. Module 105 checks user profile database 105A to obtain call management settings for users. In one embodiment, external input 120 (such as callee location, caller identifiers, and the like) is also used by module 105 to determine where to route the call.

Module 105 sends a response to switch 104 indicating the desired routing for the call. The appropriate delivery device 108 (including for example home telephone 108A, wireless telephone 108B, office telephone 108C, voicemail platform 106, and/or the like), is given the call, and the device handles the call as though it were received directly. Callee 109 then receives the call via the selected delivery device 108.

In one embodiment, when voicemail platform 106 handles a call, it can query module 105 to determine whether a voicemail message should be delivered as an email attachment 110 to email reader 111 for receipt by callee 109. In another embodiment, when voicemail platform 106 handles a call, it can activate an alert (e.g. a flashing light, a tone, or an indicator on a display) on any or all of delivery devices 108, according to callee preferences as indicated in module 105.

In one embodiment, each query from destination switch 104 includes, for example, the dialed TN and the caller TN (if known). One skilled in the art will recognize that other information may also be included in the query. In one embodiment, in response to receiving a query, module 105 returns a destination TN which may represent a delivery device 108 corresponding to the dialed number, or another device 108, or voicemail platform 106. Voicemail platform 106 can be in the same network as destination switch 104, or it can be accessible over PSTN 103.

In one embodiment, voicemail platform e-mail delivery query 107 includes the dialed TN and the caller TN (if known). In response, module 105 provides a delivery flag (yes or no), and an e-mail address.

The present invention can be implemented in connection with any type of telephone system, including home telephones, office telephones, and wireless telephones, regardless of telephone equipment and regardless of telephone service provider.

Figure 14:
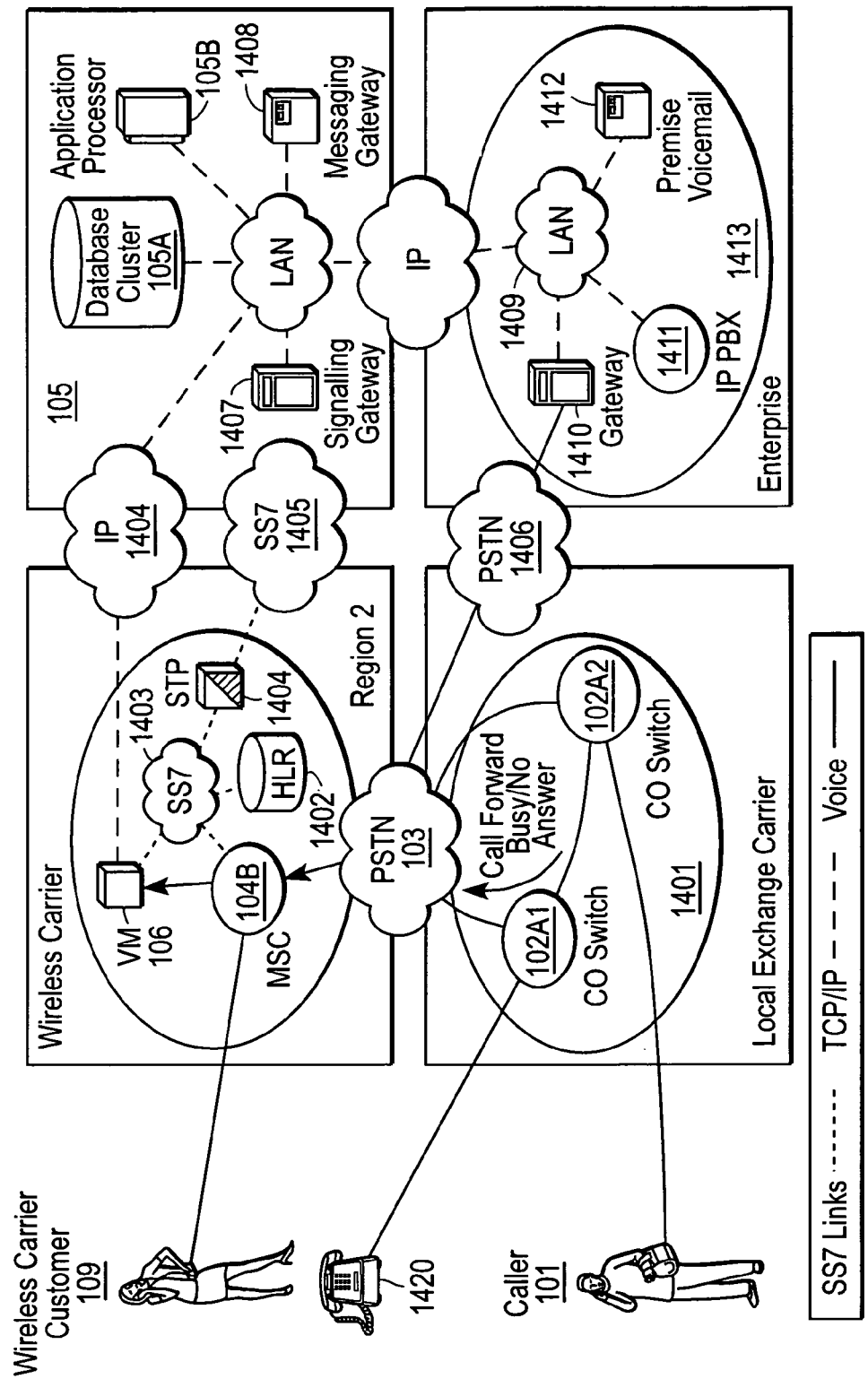
FIG. 14 is a block diagram depicting one architecture for implementing call management functionality according to the techniques of the present invention.

Referring now to FIG. 14, there is shown a block diagram depicting one architecture for implementing call management functionality according to the techniques of the present invention. When caller 101 places a call to callee 109, the call is routed to callee 109 based on rules stored in service database 105A.

Caller 202 may call a landline TN or wireless TN of callee 109. In the landline case, FIG. 14 illustrates "post-ring" management of the call. Landline phone 1420 is rung by connected CO switch 102A1 in LEC 1401. When phone 1420 goes unanswered, the call is forwarded (using a pre-provisioned "Call Forward Busy/No Answer" switch feature) over Public Switched Telephone Network (PSTN) 103 to Wireless Carrier's Mobile Switch 104B where it is then managed. Mobile Switch (MSC) 104B sends a query over SS7 network 1403 through one or more Signaling Transfer Points (STP) 1404 through signaling gateway 1407 to Application Processor 105B.

Application Processor 105B queries database 105A and returns a reply containing routing information that will be used by Mobile Switch 104B to route the call. Possible routing destinations include callee's 109 wireless phone and carrier's voicemail platform 106.

In some implementations, queries from Mobile Switch 104B may pass through the Home Location Register (HLR) 1402. In a similar fashion, when caller 101 places a call to the callee's 109 wireless phone, rather than callee's wireline phone 1420, the call is routed from originating switch 102A2, through PSTN 103 to MSC 104B. MSC 104B manages these calls "pre-ring," before the mobile phone is rung. In some cases, caller 101 is connected to an automated attendant (Interactive Voice Response, or IVR; not shown in FIG. 14).

For example, if callee 109 shares landline 1420 with a family member, MSC 104B can be instructed to temporarily connect caller 101 to voicemail platform 106 in a way that causes voicemail platform 106 to play prompts under the direction of an Application Processor (not shown) by way of Messaging gateway 1408. Calls may also be managed in an Enterprise 1413. In this case, PBX 1411 queries the service for routing information and voicemail 1412 may be used in the enterprise.

In one embodiment, signaling gateway 1407, database 105A, application processor 105B, and messaging gateway 1408 communicate with one another via Local Area Network (LAN) 1406. Similarly, components of enterprise 1413 communicate with one another via Local Area Network (LAN) 1409. LANs 1406 and 1409 communicate with one another using Internet Protocol (IP) 1202, and LAN 1406 communicates with VM 106 using IP 1202. Gateway 1410 connects LAN 1409 to PSTN 103. STP 1404 communicates with signaling gateway 1407 via SS7 1405.

In one embodiment, user profile database 105A stores the following information in order to specify a callee's call management settings:
  Set of dialed TNs (logical or physical)
  Set of delivery TNs (addresses to delivery devices)
  Set of modes (At work, At home, etc.)
  Mapping of dialed TN to delivery TN for each dialed TN and mode combination. This mapping may include the creation and application of filters, which are sets of calling party TNs that control the mapping. Further description appears below.

Authentication of dialed TNs and delivery TNs to confirm they are under the control of the callee. Further description appears below.

Call Management Configuration Interface

According to one embodiment of the present invention, call management settings described above are specified by the user via a user interface such as a website, via a cell phone or PDA, or by default initial setup. Configuration may be performed by a third-party using an API. Mode selection can also be made directly or through an API.

The following is a description of a software-based call management system configurable by the callee to route incoming calls that are originally dialed to any of the callee's managed phone numbers, according to the callee's indicated preferences. For example, the callee can specify that different incoming calls should be routed to any of a number of different delivery devices, based on any combination of factors including, for example, the number the caller dialed, the identity of the caller, the location of the caller, environmental conditions at the callee's location, and real-time callee and/or callee input at the time the call is attempted.

In one embodiment, the callee specifies such configuration options via a web-based user interface that facilitates communication with call management module 105. Referring now to FIGS. 2-7 and 9-10, there are shown screen shots depicting an example of a web-based front-end that can be used for such call management configuration. One skilled in the art will recognize that these screen shots are merely exemplary, and that many different arrangements and user interface elements can be used without departing from the essential characteristics of the present invention. One skilled in the art will further recognize that the user interface need not be web-based, and that any other type of user interface for accepting callee configuration of the system can be used.

Referring now to FIG. 2, there is shown a telephone setup screen 200. For purposes of the following description it is assumed that the user interacting with the screens is the callee; however, the user could be another individual who is configuring call management parameters on behalf of a callee.

The user enters a home phone number in field 201A, mobile phone number in field 201B, and office phone number in field 201C. The user can enter any number of additional phone numbers in field 201D, and can specify descriptions for additional phone numbers via pull-down menu 202. Other options can also be entered, including:

specifying, via check box 203, that callers without caller ID should be blocked; and enabling a VIP list via check box 204.

Callers on the VIP list get special treatment. For example, the system can be configured to allow calls from VIP callers to get through even when normal calls would be routed to voice mail or screening. Calls from numbers (people) in the user's VIP list skip through any "Screen" settings as their calls are considered emergency calls in the context of screening. Such a technique is referred to herein as "filtering".

Link 205 provides access to a VIP list management screen for adding, editing, and deleting names and numbers in the VIP list.

Figure 6:
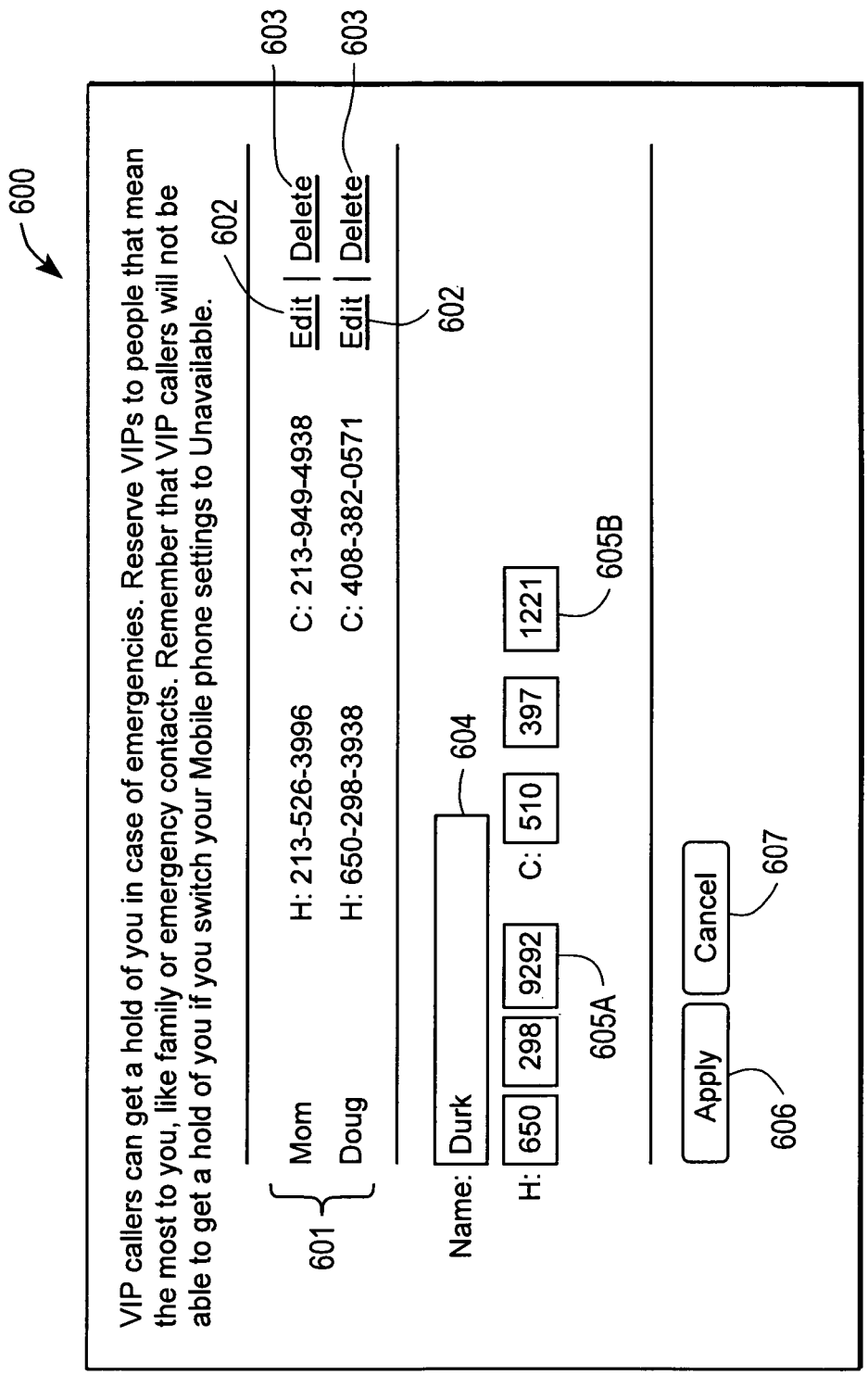
FIG. 6 is a screen shot depicting a VIP list management screen according to one embodiment.

Referring now to FIG. 6, there is shown a VIP list management screen 600 according to one embodiment. List 601 shows current VIP entries. The user can edit entries by clicking on an Edit link 602, or delete entries by clicking on a Delete link 603.

After clicking on an Edit link 602, the user can specify a name in field 604, and one or two telephone numbers in fields 605A and 605B. Apply button 606 applies the changes; cancel button 607 dismisses screen 606 without applying any changes.

Referring again to FIG. 2, the user can specify email addresses in fields 206, 207 for call notification emails and for receiving voicemail, respectively. Buttons 208, 209 facilitate navigation to other screens in the call management setup application.

Figure 3:
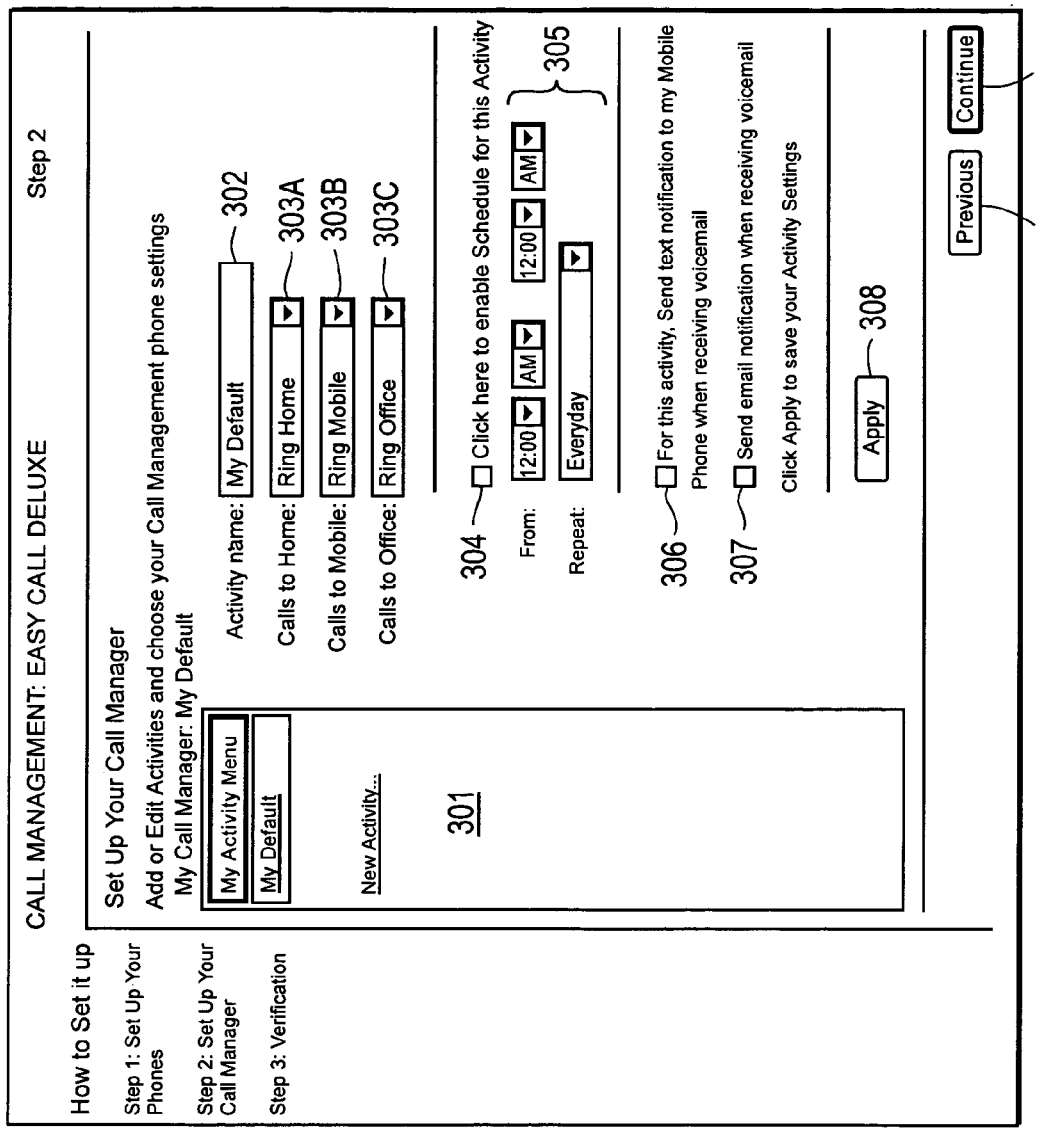
FIGS. 3, 4, and 5 are screen shots depicting call manager setup screens according to one embodiment.
Figure 4:
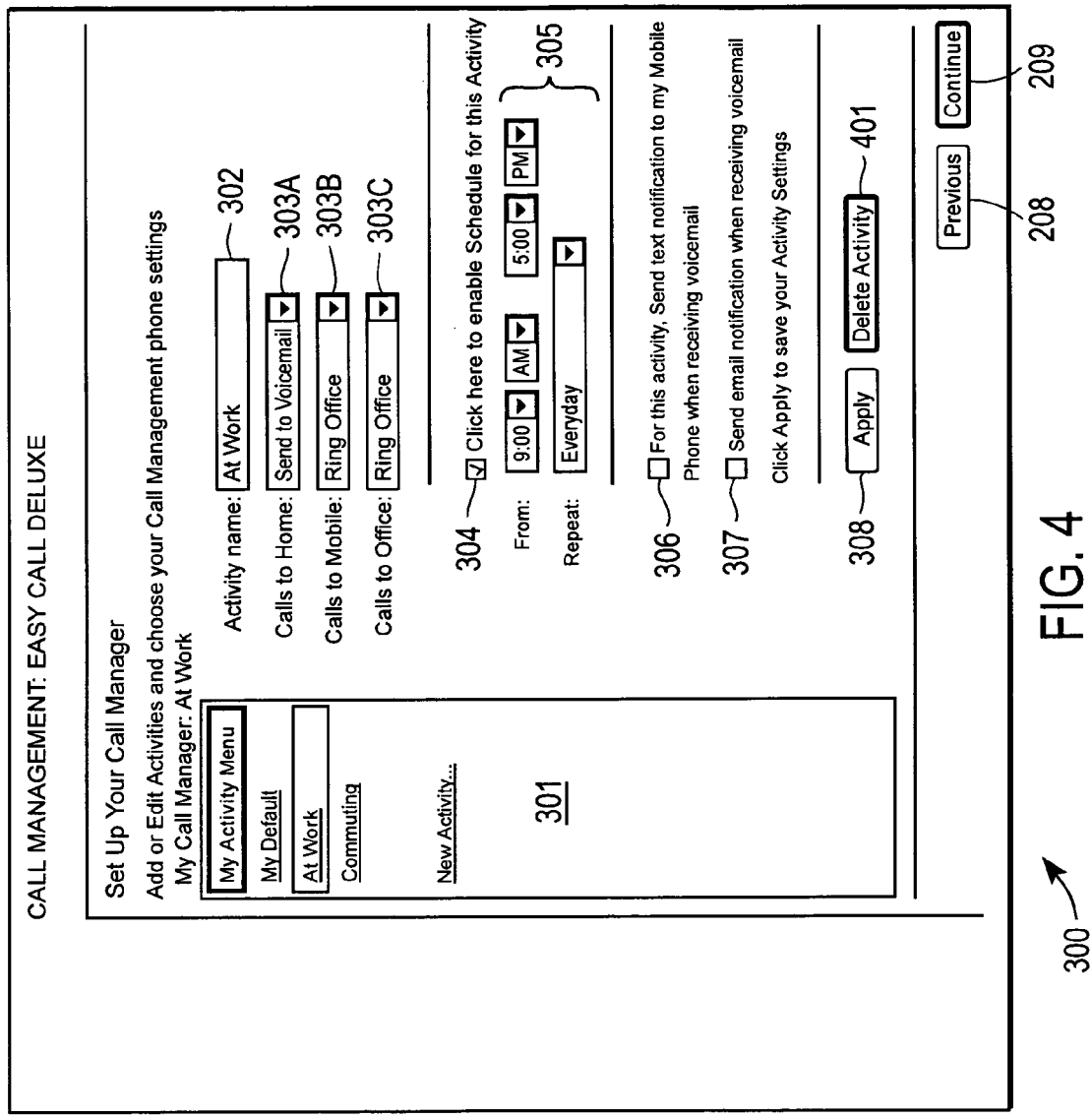
Figure 5:
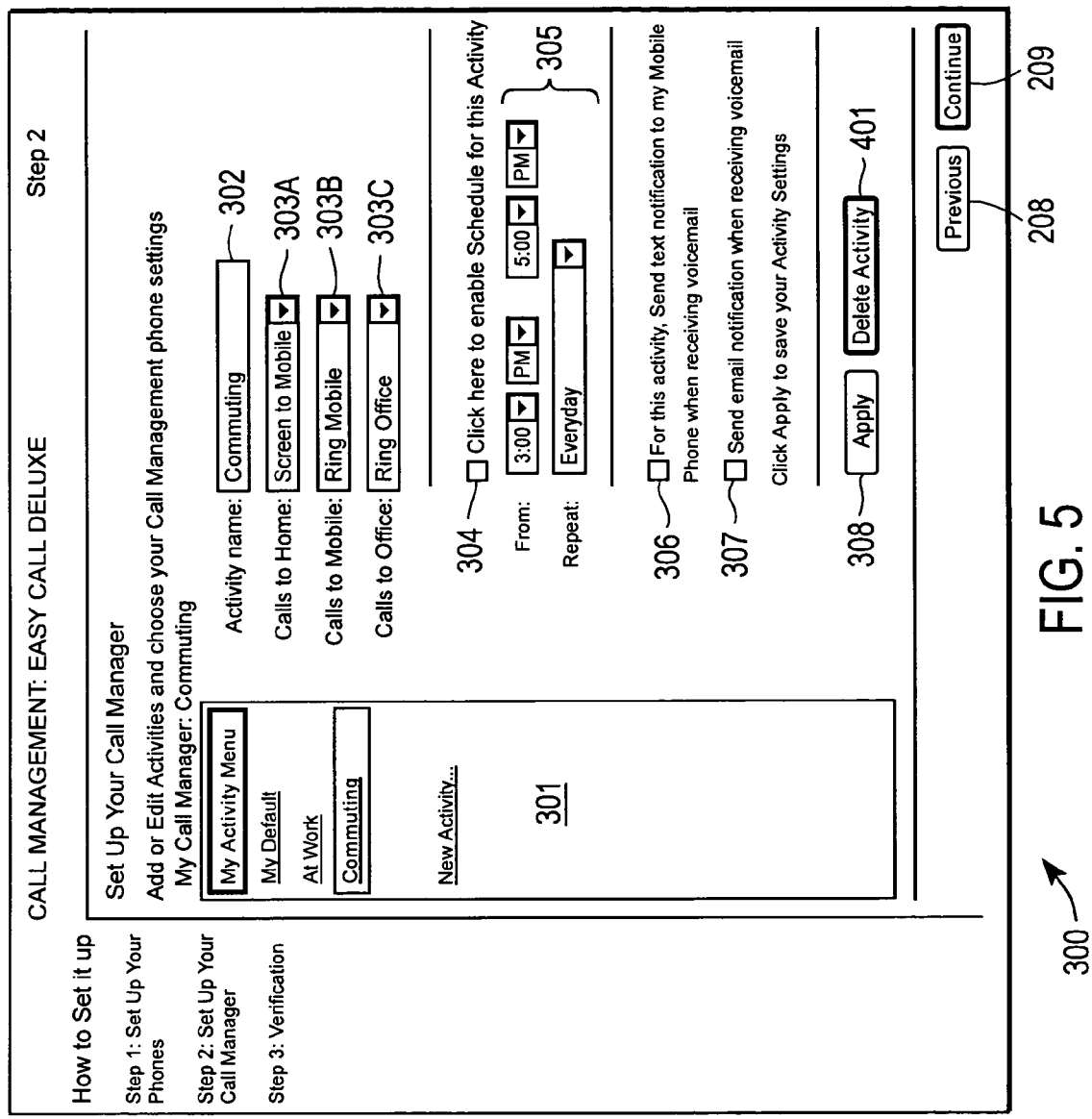

Referring now to FIGS. 3, 4, and 5 there are shown call manager setup screens 300 according to one embodiment.

The user can configure call routing for each mode (activity) the user defines. Modes in this example are "My Default", "At Work," "At Home," and "Commuting". The user can select which mode to define from activity menu 301. In field 302, he or she can specify the name for the mode (activity). Popup menus 303A, 303B, 303C allow the user to specify how calls should be handled when they are received at the home number, mobile number, and office number, respectively. In one embodiment, each popup menu 303 allows the user to select among routing the call to a particular destination device 108, to voicemail 106, or to screen the call, or the like.

Check box 304 allows the user to enable a preset schedule for the mode. If check box 304 is checked, the mode will automatically be activated at the times specified in popup menus 305.

Check box 306 allows the user to select whether text notification should be sent to the mobile phone when a voicemail message is received.

Check box 207 allows the user to select whether an email message should be sent when a voicemail message is received.

Apply button 308 applies the changes indicated by the user. Delete activity button 401 deletes the mode (activity) from menu 301. Navigation buttons 208, 209 allow the user to navigate to other call setup screens.

In the example shown, as depicted in FIG. 3, the user has configured the "My Default" activity so that calls to home, mobile, or office are routed to the respective delivery devices.

In the example shown, as depicted in FIG. 4, the user has configured the "At Work" activity so that calls to home are sent to voicemail and calls to both mobile and office are sent to the office. This mode is scheduled to be active from 9 am through 5 pm every workday. Check box 306 has been activated, so that text notification will be sent when voicemail is received.

In the example shown, as depicted in FIG. 5, the user has configured the "Commuting" activity so that calls to home are screened to the mobile phone and calls to mobile or office are connected to the mobile phone. A message is played to the caller; "The person you are trying to contact is currently unavailable, if this is an emergency press 1, otherwise press 2 to leave a message." If the caller presses 1, he or she is connected to the mobile device. If he or she presses 2, he or she is connected to the voicemail platform.

Figure 7:
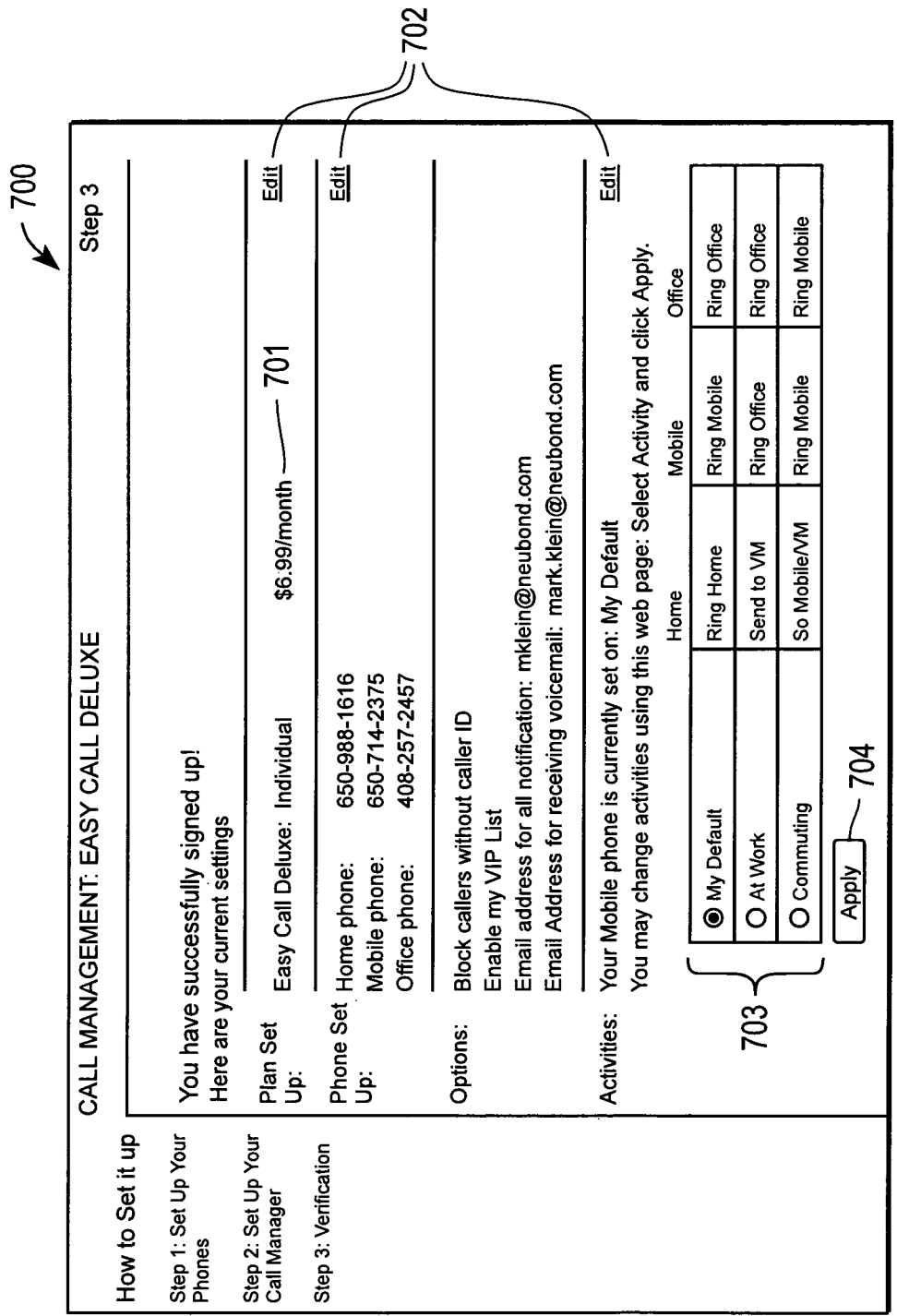
FIG. 7 is a screen shot depicting an example of a call management summary screen according to one embodiment.

After setup is complete, the user can view a summary of his or her Call Management settings. Referring now to FIG. 7, there is shown an example of a call management summary screen 700 according to one embodiment. A summary 701 of settings is shown, with Edit buttons 702 allowing the user to return to a screen for changing settings. The user can select which mode is active by clicking on one of radio buttons 703. Apply button 704 applies the changes.

Figure 8:
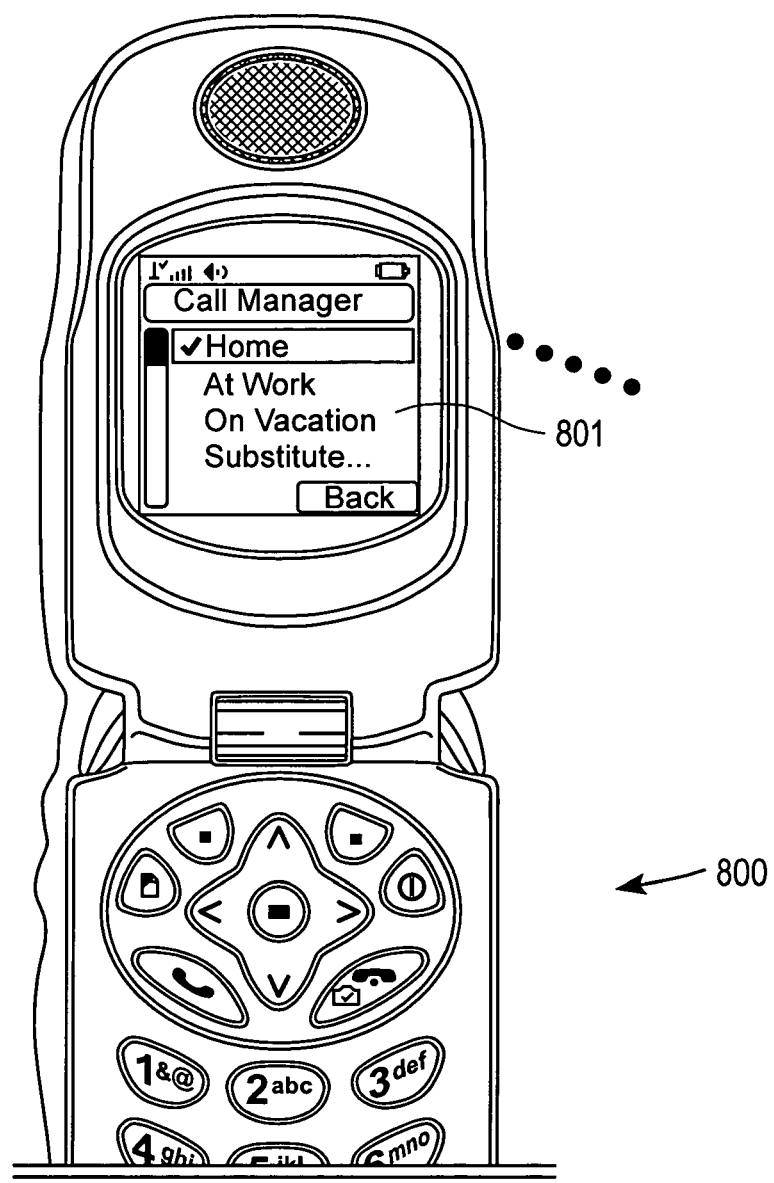
FIG. 8 is a screen shot depicting an example of a user interface for selecting among modes via a mobile phone handset.

In one embodiment, the user can select among modes by other means as well. Referring now to FIG. 8, there is shown an example of a user interface for selecting among modes via a mobile phone handset 800.

In one embodiment, the system of the present invention activates different modes depending on any of: explicit selection, time of day (and/or day of week), location of the callee (detected, for example by GPS positioning, or by noting that the user has used a particular phone recently, or by explicit user indication of location). In one embodiment, scheduled modes are automatically active during scheduled times. In one embodiment, scheduling can be turned on or off from the handset or from the website.

Based on the user-specified configuration options described above, a call routing matrix can be constructed. Referring now to FIG. 19, there is shown an example of a call routing matrix 1900 according to one embodiment. Matrix 1900 summarizes call handling preferences according to callee mode and caller identity. Each row in matrix 1900 represents a mode, and each column represents a filter option (a particular caller or caller group). Current mode 1904 is also shown.

In the example shown, matrix 1900 provides input fields for specifying additional call routing configuration options. For example, pull-down menus 1901 allow the user to schedule certain modes and/or to specify how mode activation can be automatically handled based on location or other factors. Pull-down menus 1902 allow the user to switch manually to a desired mode. Link 1903 allows the user to access additional edit options.

In one embodiment, any or all of the summary information and input fields of FIG. 19 can be shown in the context of other types of user interfaces, including for example an interface for a PDA or cell phone screen.

Call Handling

When a call is made to callee 109, module 105 directs the call based on any combination of the following factors: call routing rules as specified above, currently active mode, caller identification (or lack thereof), called telephone number, mode, and caller or callee input as described above. In one embodiment, call routing may also be determined by the system based on routing decisions the user has made in the past. Thus, the present invention can use intelligent call management algorithms, including for example collaborative filtering based on the behavior of a set of users, to learn about users' preferences without requiring explicit selection.

For example, if the system recognizes that, at a given location, calls to all users are almost never answered, it can automatically route calls to callees in that location to voicemail, while sending a SMS notification to the callee. Examples of locations where such a situation may occur are a movie theater and a lecture hall. The system can determine these location behaviors empirically, for example based on system usage. Alternatively, the system can use a database of location classifications to extrapolate a user's behavior (or set of user's collaborative behavior) from one location to another location of similar classification.

In one embodiment, call handling is accomplished as follows. When a call is placed to one of a user's managed telephone numbers, a database query is made before the call is completed. The result of the database query causes the call to complete to the originally dialed device (device associated with the managed telephone number), to be redirected to another delivery device (which may, or may not, also be in the set of managed telephone numbers), or to be redirected to the system handling the user's voicemail. The call routing is thus performed in a manner that is seamless to both the caller and the callee.

Rule-Based Routing

In one embodiment, the system of the present invention implements rule-based routing based on the data stored in database 105A.

Rules are implemented in a manner that resembles operands. For any given call management situation, only one rule is executed, so as to definitively dispose of the call.

The rules are created by program logic, on a web server and in database 105A, when callee 109 configures his or her account. When a managed call is handled by the system of the present invention, a determination is made as to which single rule is to be executed by the switch. If more than one callee 109 shares the managed phone line (managed TN), a single rule is identified for each callee 109 and returned to the querying server ("telephone server," Signaling Application Processor, etc.). That server causes the caller to be asked which user they are calling. (For example, "Press 1 for Joe; Press 2 for Jane") After that selection is made by the caller, the appropriate call-routing rule is executed. If only a single user is associated with a managed TN, the rule for that user is executed without need for caller interaction. Accordingly, in one embodiment database 105A stores a representation of a chart for a particular callee 109; the chart sets forth a set of rules. Each rule is qualified by any or all of the following:

Which mode is the callee in?
What TN was called by the caller?
What group (i.e., set of caller TNs) does the caller belong to?
Does the caller have caller ID?

Associated with each rule is an action (or more than one action), also referred to as op-codes. Examples include:

Deliver the call to a TN;
Route the call to VM;
Try to deliver the call, then go to VM if no answer or busy;
Screen (if no caller ID, require caller to enter telephone number);
Sequentially ring multiple delivery TN, stopping the sequence if the callee is reached;
Simultaneously ring multiple delivery TN—if the callee is reached, stop ringing the other devices.

In one embodiment, database 105A includes a representation of a number of rules, each including any or all of the above.

As discussed herein, callee 109 modes can be based on explicit selection, or on location, or by a schedule, or by other predetermined conditions. In one embodiment, certain modes may expire automatically after a defined period of time; then, the callee 109 returns to a default mode or previous mode.

Rule Selection and Application

In one embodiment, the schema and indexing of the table is designed to facilitate rapid lookup during call-handling operation. When the system of the present invention receives notification from a switch (LEC, MSC, PBX, etc.) that a call has been placed to an managed telephone number (managed TN), the system of the present invention does the following:

1. Determine all callees 109 that are associated with that managed TN. This results in a set of user IDs.

For each callee 109:

2. Determine what group or groups the caller is a member of based on caller TN (Caller ID).
3. Determine what mode callee 109 is in.
4. Identify all the rules in the userRule table with a userID that matches callee's 109 ID, a userStatusID that matches callee's 109 status ID, a userManagedAddressID that matches the ID associated with the managed TN (1 in the table means "don't care"— the rule applies to any managed TN), and if filterType=FILTER the callerGroupID is in the set of groups the caller is a member of. If filterType=DON'T_CARE, the rule applies to all callers. If filterType=NO_CID, the rule applies to callers with blocked CallerID.

5. Select the rule with the lowest ruleRank number.

For each user associated with the managed TN, the "instruction" part of the selected rule is returned. This instruction part consists of an opcode and some operands. These are: opcodeID, deliveryDeviceID1, deliveryDeviceID2 and 2 notification options: callNotifyEmailOption and callNotifySMSOption. The deliverDeviceIDs reference telephone numbers stored elsewhere in the database. When the rule instruction is returned, by the database, to the querying server telephone numbers are returned instead of deliveryDeviceIDs.

When the user is identified by the Platform (on caller selection in the case of multiple users on a managed TN), the associated rule instruction (or op-code) is executed.

EXAMPLE

Referring now to FIG. 17, there is shown a table 1700 containing an example set of rules for a callee 109, including a set of op-codes. callNotifyEmailOption and callNotifySMSOption are notification options which, if set to 'Y', cause the system of the present invention to send a call notification to callee 109 using an address stored elsewhere.

Op-Codes

The following is an example of a set of op-codes for use by the system of the present invention. One skilled in the art will recognize that many other types of op-codes can also be used. The op-code "CONNECT_DIALED_DEVICE" is transformed to "CONNECT" by database logic before being returned to the querying server ("telephone server") using information available at call time (specifically the called number). The op-code "CONNECT_INTERNAL_VM" is transformed to "VOICEMAIL" if the voicemail access number stored in the database is handled by the same telephone server that is making the database query; this direct internal connection saves the resources required to place an additional call.

not be associated with the provider of module 105. A user can have any number of voicemail repositories, though many users will find it convenient to direct all voicemail calls to a single voicemail repository. Thus, the user may select a voicemail service and repository provided by one of the carriers that the user is using for telephone service. Alternatively, the user may select voicemail service from a third-party provider that is not associated with any of the user's phones.

In one embodiment, when initially signing up for call management services such as those provided by the present invention, the user can select a voicemail service provider from a list of available providers.

Then, when call management configuration specifies that a call should go to voicemail, module 105 directs the call to the appropriate voicemail access phone number. In one embodiment, unanswered calls (busy or no answer after four rings) are also routed to the appropriate voicemail access phone number.

In one embodiment, other enhanced services, such as call notification (via e-mail, SMS message, Stutter-Dial-Tone, and the like) or integrated call logging (one list of incoming calls across all of a user's managed phones) can be provided independently of the user's telecom carriers.

Real-Time Mapping

In one embodiment, the system of the present invention performs real-time mapping and rule selection on call-by-call basis. Thus, inputs are evaluated at the time the call comes in, so as to select the rule based on the most up-to-date information. Thus the present invention ensures that calls are correctly routed based on the most current sources of information and settings.

Identifying the Callee by Non-NANP Identifier

As described above, the call management system of the present invention allows a user (callee) to control how they are reached by phone. When one of the user's telephone numbers is dialed, the call is routed pursuant to the desire of the user. Thus, incoming calls may be routed, for example, to the phone at the callee's current location or to voicemail (if they consider themselves unavailable for phone calls).

In one embodiment, a caller can identify a callee to be called by some identifier other than the telephone number (in

| OpcodeID | opcode | description | ruleOpcode | outputOpcode |
|---|---|---|---|---|
| 1 | CONNECT | Connect to Delivery Device 1 (ID1) | Y | Y |
| 2 | VOICEMAIL | Connect to Voicemail (ID1) | Y | Y |
| 3 | CALLER_CHOICE | Caller choice (ID1 = phone, ID2 = voicemail) | Y | Y |
| 4 | CONNECT_DIALED_DEVICE | Connect to Delivery Device matching the TN of the Dialed TN - converted to CONNECT for telephone server | Y | N |
| 5 | NO_CID_GETCALLERTN | No CID Screen - require caller to enter CID - only use with NO_CID filter | Y | Y |
| 6 | REJECT | Drop the call | Y | Y |
| 7 | EMERGENCY_CONNECT | Connect to Delivery Device 1 (ID1) after Emergency press-1 screening | Y | Y |
| 8 | CONNECT_INTERNAL_VM | Map to this in VOICEMAIL case if delivery device is Apollo VM | N | Y |
| 9 | CONNECT_SIMULRING | Ring (ID1) and (ID2) and make connection to the first one picked up | Y | Y |

In one embodiment, voicemail platform 106 and other enhanced services can be provided by any provider and need other words, an identifier that is not in conformity with the North American Numbering Plan (NANP) for telephone numbers). Thus, in essence the caller attempts to call a person rather than a telephone number; in fact, the callee may not even be aware of the callee's telephone number.

For example, the caller may initiate a call via a web interface, PDA interface, cell phone interface or by some other means. The caller may select or enter the callee's name or email address, or may even click on a link on a web page to attempt to reach the callee. The caller's action causes module 105 to perform a database lookup and to initiate a telephone call to callee according to the current mode and callee preferences, as described above. Thus, in this embodiment, calls are routed in a similar manner as above but the caller has identified the callee by means other than the telephone number.

In one embodiment, the callee can specify that calls initiated by identifying the callee by some mechanism other than telephone number are handled differently than calls initiated by dialing a telephone number. Thus, for example, a call initiated by selecting a name from a web page might go to voicemail, while calls initiated by dialing a telephone number might be routed to the callee's wireless phone. Such a mechanism can be implemented for example by providing one or more additional pull-down menus in the screen shown in FIG. 3, allowing selection of actions to be taken if the callee is called using alternative identifying means.

Figure 12:
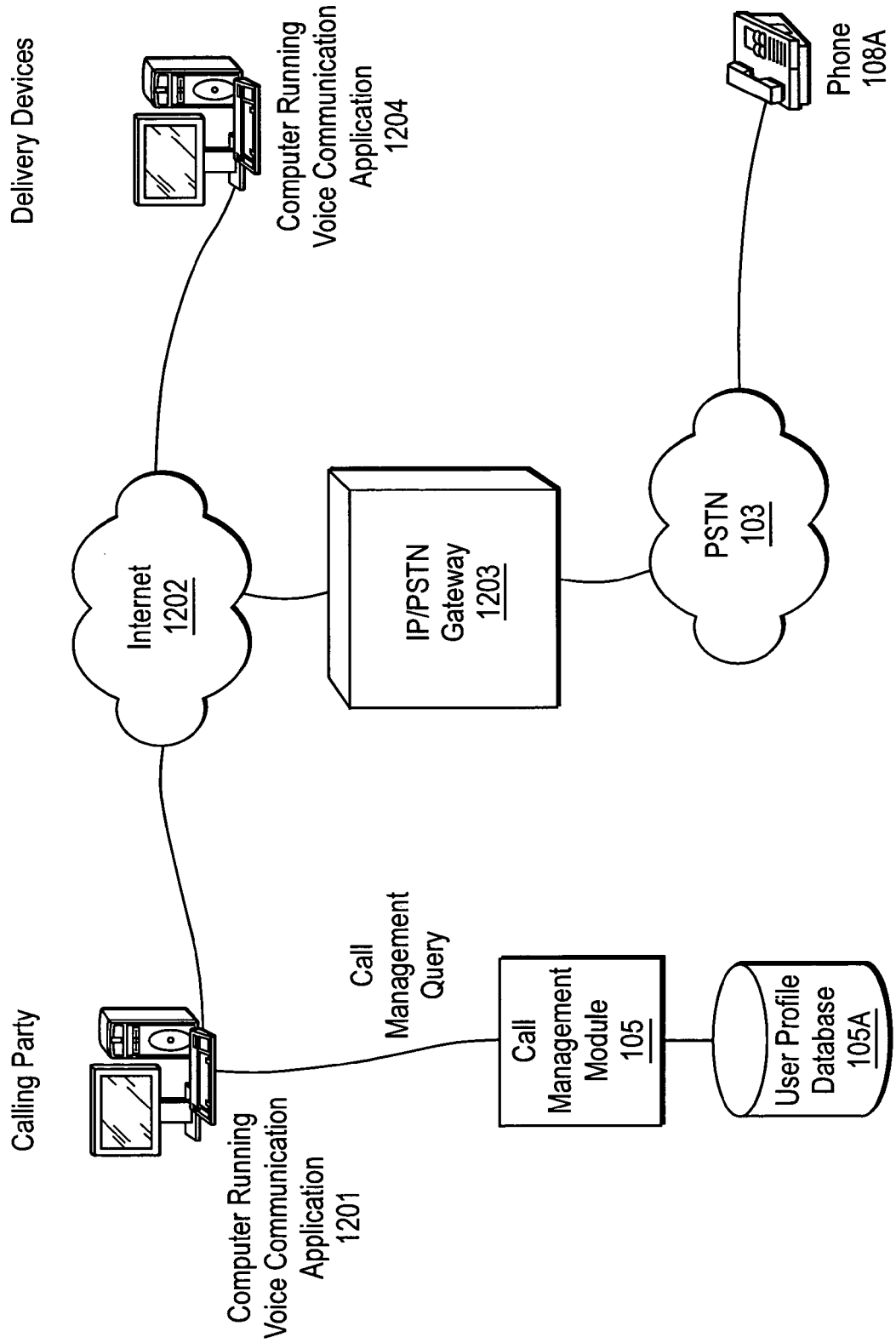
FIG. 12 is a block diagram depicting an architecture for implementing callee identification by means other than NANP telephone numbers, according to one embodiment.

Referring now to FIG. 12, there is shown a block diagram depicting an architecture for implementing callee identification by means other than telephone numbers, according to one embodiment.

A caller places a call, for example via computer 1201 that is running a voice communication application. The caller identifies the callee by some means other than entering a NANP telephone number, for example by entering the callee's e-mail address. The application running on computer 1201 contacts call management configuration storage and routing module 105 to determine how to route the call. Based on callee preferences, routing module 105 causes the call to be routed to another computer 1204 or to a NANP device such as telephone 108A connected to PSTN 103 via an IP/PSTN gateway 1203. In one embodiment, the call is routed from computer 1201 to gateway 1203 or to computer 1204 via the Internet 1202.

In one embodiment, non-NANP calls can be placed using Voice over Internet Protocol (VoIP). These calls can be initiated using Session Initiation Protocol (SIP). To re-route a SIP call, call management module 105 can be registered (with a network SoftSwitch) to handle the callee's VoIP telephone calls. When a call is placed to the callee VoIP phone or computer acting as a VoIP phone 1204, the SoftSwitch sends an "Invite" message to call management module 105. Call management module 105 responds with a redirection message that causes the SoftSwitch to either complete the call as originally directed or to terminate the call on another device (VoIP/SIP phone, PSTN phone, or voicemail platform).

Distinctive Ring Tones

In one embodiment, the present invention provides distinctive ring tones based on any of a number of factors, including which number was dialed, caller identification, or the like.

Call management screen, as described above in connection with FIG. 3, can be enhanced in one embodiment by adding user interface elements that allow the user to specify different types of call notification depending on certain conditions. The notification can be, for example, a distinctive ring on the delivery device or a distinctive Instant Message notification on a computer. A user may specify that calls routed from his or her office phone ring to his or her home phone using an alternate short-ring-cycle distinctive ring, while other calls use the standard ring. In one implementation, the ring type can be controlled by routing the call to one of two phone numbers associated with the telephone line using a standard LEC (Local Exchange Carrier) "distinctive ring" feature.

In one implementation, the ring type on a mobile phone may be modified in real time immediately before the system routes a call to that phone by sending a Short Message Service (SMS) message (or other data message) to a software application running on the phone. The software application changes the phone ring type according to instructions sent in the SMS message.

Informing Callee Who is Calling

In one embodiment, the present invention uses an alternative communications path, such as short message service (SMS), email, instant messaging, or the like, to let the callee know who is calling. The message to the callee can include additional information about the call, including how it was routed, where the caller is located, caller's telephone number, caller's name (from the user's directory or from other sources such as a CNAM database), number dialed by the caller, and the time of the call and the like.

In one embodiment, the callee can specify which incoming calls should include such notification, and what type of communications path/mechanism should be used. E-mail notification of calls may also be configured. The content of the notification may include the caller's telephone number, the caller's name (from the user's directory or from other sources such as a CNAM database), the number dialed by the caller, and the time of the call. In alternative embodiments, other types of information may be included.

In one embodiment, when Call management module 105 receives a query from a telecom switch 102 or PBX 104C, it dips User profile database 105B to determine how to respond to the query. Information returned from database 105B includes a callee notification configuration. This information includes how to send notification to callee 109 and in what format to send it. In the case of e-mail notification, Call management module 105 formats an e-mail message and sends that message over the Internet through an mail (SMTP) server.

Calls Converted to Other Types of Communication

In one embodiment, the present invention can convert telephone calls into email messages, SMS messages, instant messages, or other types of communications.

Figure 9:
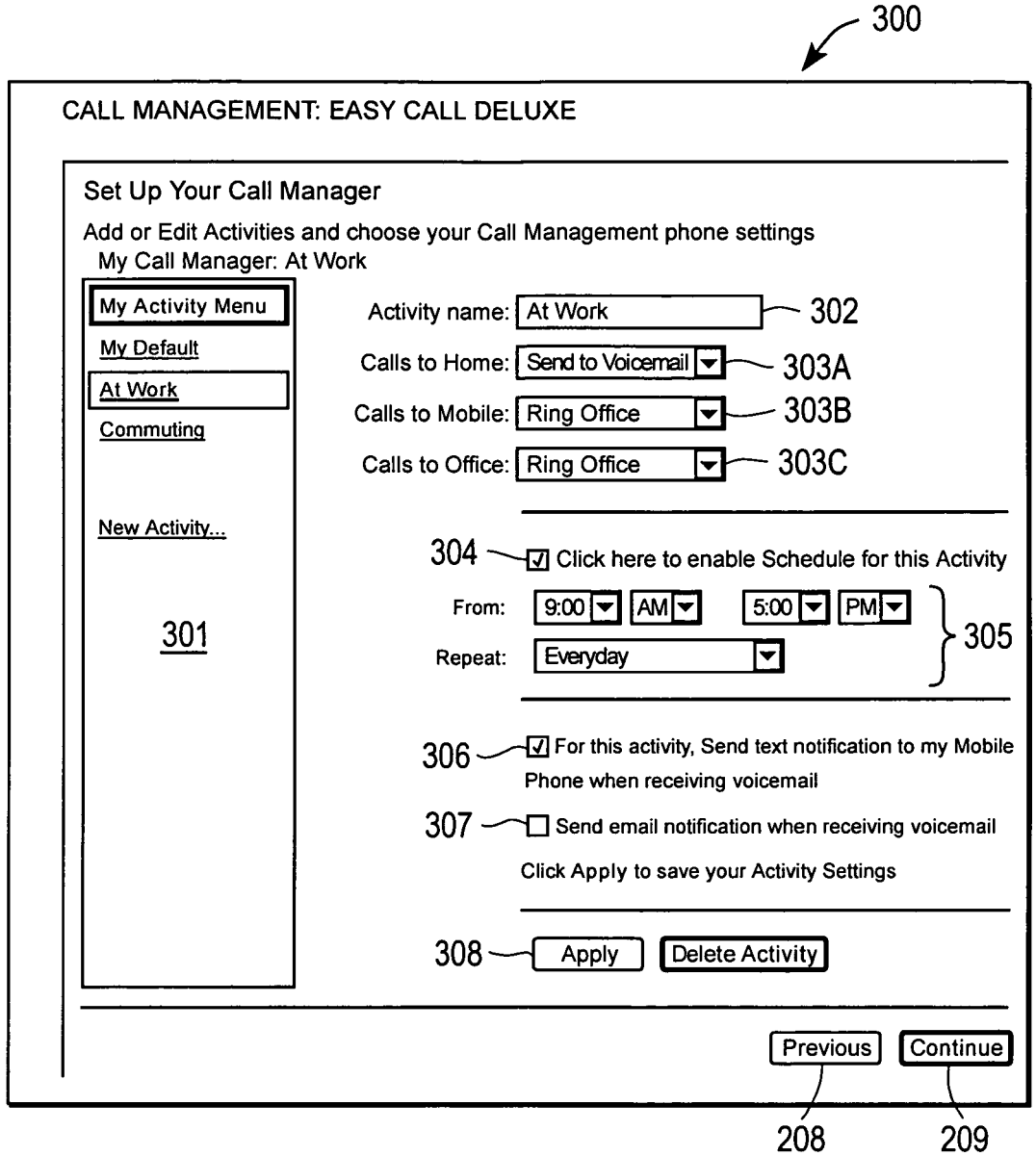
FIG. 9 is a screen shot depicting a call manager setup screen wherein some calls are converted to voicemails, according to one embodiment.

Referring now to FIG. 9, call management screen 300 is enhanced in one embodiment by adding user interface elements that allow the user to specify that certain telephone calls (depending on any of the factors discussed above), should be converted to other types of communications. Specifically, as shown in FIG. 9, menu 303A includes a "send to voicemail" option that allows the callee to specify that while at work, calls to his or her home number should be sent to voicemail. The system can further be configured to convert the voicemail to an email message or to attach it to an email message and send it to the callee's work email address. Content of the communication can include additional information about the call, including how it was routed, where the caller is located, caller's telephone number, caller's name (from the user's directory or from other sources such as a CNAM database), number dialed by the caller, and the time of the call and the like. In one embodiment, this information about the call and the caller is compiled from information passed in the query to the Call management module 105 combined with derived information (for example a directory lookup of the caller's name based on the calling telephone number) and independent information such as the time the call was processed by the system.

In one embodiment, voicemail platform 106 queries module 105 to determine whether to deliver a voicemail message using e-mail. Module 105 obtains profile information from database 105A. This determination is made based on user preference as a function of any or all of mode, callee, and dialed telephone number.

Mapping Different Phone Numbers to Different Modes

In one embodiment, the present invention facilitates mapping of different phone numbers to different modes. For a single callee, several telephone numbers can be established; for example, one for important calls, one for business calls, one (or more) disposable numbers, and the like. Such an arrangement allows the callee to better manage his or her calls by giving out the appropriate number from the set of telephone numbers, depending on the situation. The various telephone numbers need not have any correlation to actual physical locations or telephones.

Figure 10:
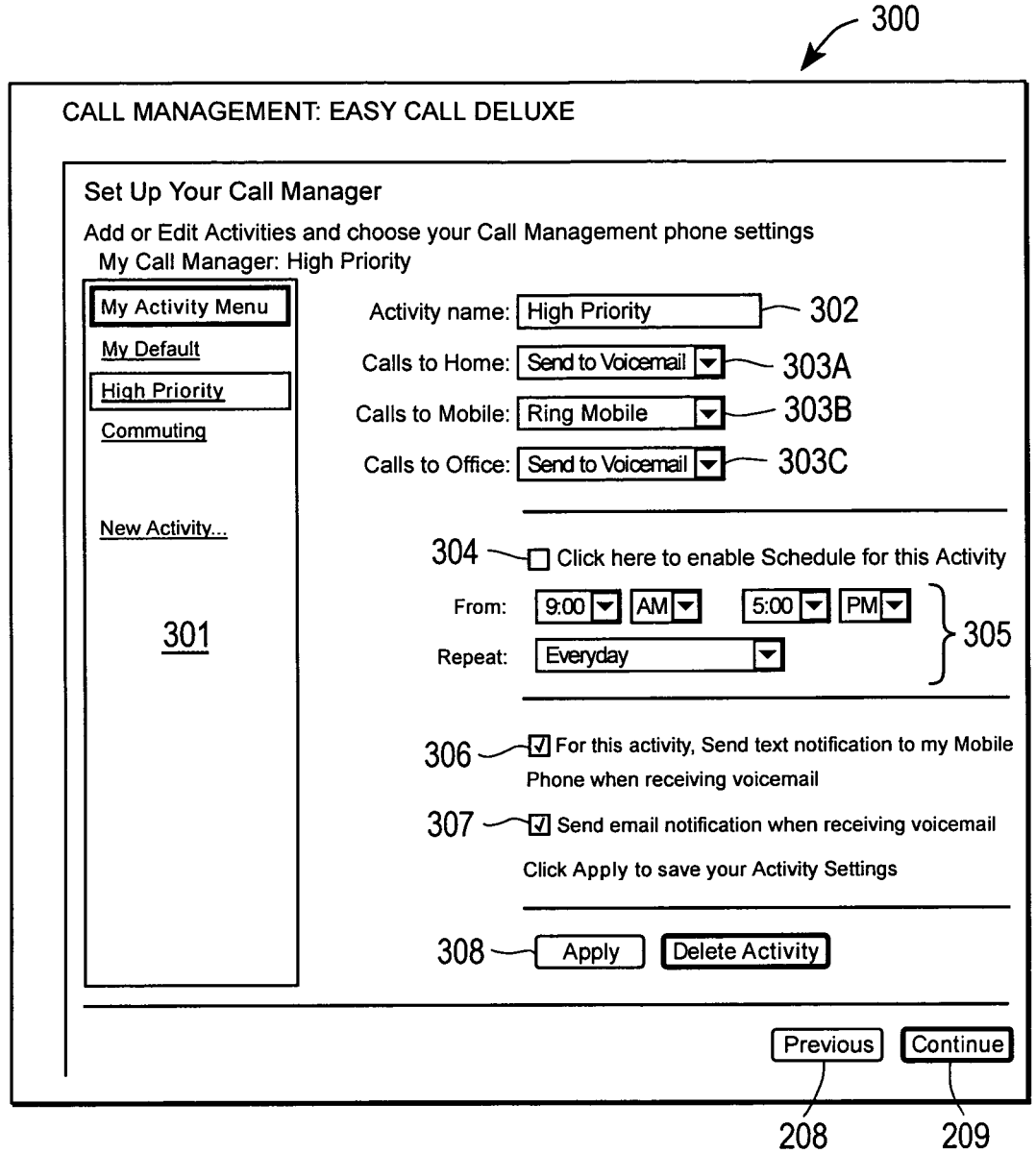
FIG. 10 is a screen shot depicting a call manager setup screen wherein calls to different phone numbers are handled differently.

Referring now to FIG. 10, there is shown an example of call management screen 300 wherein calls to different phone numbers are handled differently. In this example, when the user has selected the "High Priority" mode, only calls to the mobile phone will ring through. Calls placed to home and office phones will be routed directly to voicemail. Thus, the user can give out the mobile phone number to those callers whom the user deems most important.

In one embodiment, a disposable telephone number (valid for a limited time period) can be offered. Calls made to temporary (disposable) telephone numbers are routed to one of the user's delivery devices or to voicemail, depending on the user's stated preferences. The assignment of a temporary number can be made dynamically from a pool of available numbers. The number may remain valid for a single call, for a brief time period, or for a long time period.

One example of the use of a temporary telephone number is as a contact number for people communicating using Internet Chat. A temporary number can be provided as a "public" number for a user allowing that user to give the telephone number to another person to make a single call. The user's actual delivery device telephone numbers remain private. After use, the telephone number is suspended for some period of time and then returned to the pool of available temporary telephone numbers.

In another embodiment, a temporary address number is given to the user along with a common access number. After calling a common access number (for example, a toll-free number), the caller enters the temporary address number (a sequence of digits). The call is then routed to the appropriate user's delivery device or voicemail. The system generates a temporary address number, for example a unique digit string that is valid for a limited time. During that time, when a caller calls the common access number, it is answered by a telephone server (not shown). The telephone server queries User profile database 105A. Database 105A treats the temporary address number as a managed address for purposes of determining the routing rule to pass to the telephone server. The telephone server executes the routing rule, which results in sending the call to a telephone, voicemail, or some other call handling device.

In a shared line situation, where a subset of the members of a family have wireless phones, the present invention can split off calls for those with other phones (wireless or office) as defined in the configuration profile.

Callee Mode Information on Caller Device

In one embodiment, potential callers can see mode information for callees. In one embodiment, callees can choose whether or not to make such information available to potential callers. Additionally, callees can choose to make such information available only to some potential callers, if desired.

In one embodiment, a potential caller can see mode information by keying in the phone number of the callee in a cell phone or other device, or by selecting the callee from a directory, or by some other means. In one embodiment, when appropriate, the calling device queries the system of the present invention to obtain a description of the callee's current mode. A representation of that mode is displayed the potential caller, who can then decide whether or not to attempt to complete the call.

In this context, a callee's mode information is a label that reflects the callee's desire, ability, or propensity to accept any, or certain types of, phone calls. User B's mode can be presented to User A before and/or after User A places a call to User B.

If mode information is presented to User A before a call is placed to User B, User A can use knowledge of User B's mode in deciding whether or not to initiate a call to User B. If mode information is presented to User A after a call is placed to User B, User A can use that knowledge as context for discussion with User B if the call is picked up by User B or for understanding why the call was not picked up by User B.

The displayed mode may be set explicitly by that callee or it may be a function of the callee's mode; in other words, the callee may specify that the displayed mode not be the same as the actual mode. All inputs used to determine mode can also be used to algorithmically determine the user's mode. User A may learn of User B's mode by viewing an address book entry on a client device (mobile phone or other device), by selecting a "show mode" soft-key on a client device, or by some other means on the client device. User A may also learn of User B's mode after calling User B.

Callee mode information can be determined when another user queries for it or it can be determined periodically by the system. If the mode is determined periodically, it can be stored and made available for query or it can be pushed to the client devices of all users who have access to the information.

Figure 11:
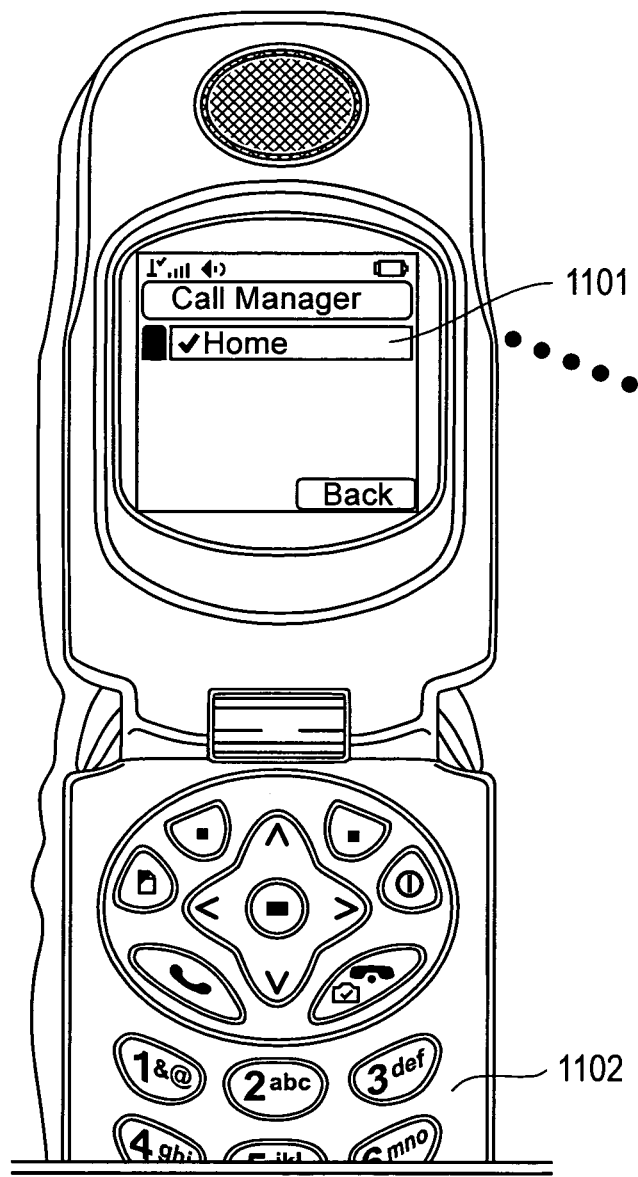
FIG. 11 a screen shot depicting an example wherein a current activity mode for a callee is displayed on a caller's device.

Referring now to FIG. 11, there is shown an example of a cell phone display wherein a current activity mode 1101 (Home) for a callee is displayed. This display would be shown, for example, after the user of the cell phone had keyed in the telephone number of the callee on keypad 1102 (or after he or she had selected the callee's name from an on-screen list or directory).

In one embodiment, the display of the mode indicates whether the callee is at home, at work, on vacation, or the like. In another embodiment, additional information can be displayed, such as the callee's activity mode schedule, an indication of when the current mode will change and what the next mode will be, forwarding information (such as substitute telephone number), or any combination thereof. The callee can specify what kind of information is displayed, and can indicate that different kinds of information be made available to different callers or depending on other factors.

Overview of Operation of System

In one embodiment, the system of the present invention is implemented as follows. First a call being made is intercepted as follows:

Calls to a residential line are intercepted using Advanced Intelligent Network (AIN) at the destination switch in the LEC CO.

Calls to a wireless phone are intercepted using Wireless Intelligent Network (WIN) or Customized Applications for Mobile network Enhanced Logic (CAMEL) at the destination switch in the MSC.

Calls to a PBX extension, placed from outside the PBX, are intercepted using AIN in the LEC CO connected to the PBX.

Calls to a PBX extension, placed from another PBX extension, are intercepted in the PBX.

Then, a database dip is performed to determine how to dispose of the call. Disposition options are: let it complete, forward it elsewhere, or send it to voicemail. The database dip is performed on a specialized database or mirror. Interfaces to the database include AIN/WIN/CAMEL to an SCP via SS7 or XML via the Internet.

Database dips may be made directly or through a partner that runs the SS7 network as a front-end to the database, either by contacting the database in real-time (pull) or hosting a mirror of the database (push).

Overall Architecture and Operational Mechanism

Figure 13:
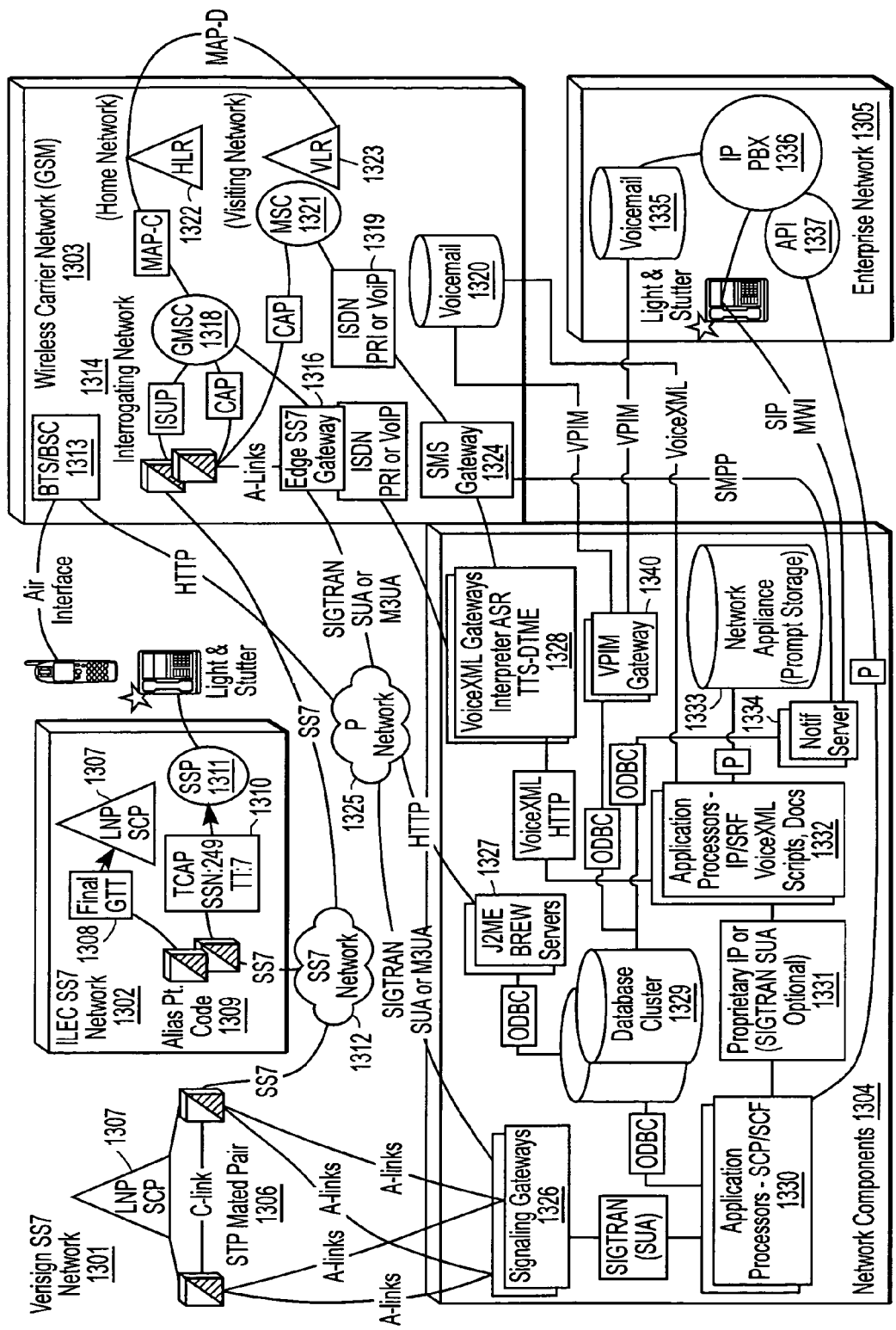
FIG. 13 is a block diagram depicting an example of a detailed architecture for implementing the present invention according to one embodiment.

Referring now to FIG. 13, there is shown an example of a detailed architecture for implementing the present invention according to one embodiment. For illustrative purposes, the wireless network shown is a GSM network. CDMA and other wireless protocols are also supported. For illustrative purposes, a redundant centralized configuration is shown in the example of FIG. 13. However, one skilled in the art will recognize that the invention can also be implemented using, for example, a geographically distributed architecture.

SS7 Network 1301 provides the SS7 connectivity between service platform 1304 and Wireless Carrier Network 1303. Such a network may be provided, for example, by a wireless telephone company such as Verizon. One skilled in the art will recognize that other mechanisms for connecting components 1304 and 1303 can be used.

Enterprise Network 1305 connects to the service platform 1304 using Internet protocol (IP). ILEC SS7 Network 1302 is used to turn message waiting on and off on landline phones. Elements in 1301 and 1302 are optional components that need not be included in order to practice the present invention.

In the embodiment shown in FIG. 13, when a call addressed to a managed telephone number is received by MSC 1321, MSC 1321 sends a query containing the called TN and calling TN to Application Processor-SCP 1330 using a TCAP message over the Signaling System 7 (SS7). This message travels over one or more Service Transfer Points (STP) 1315, 1306 in SS7 network 1312 and through Signaling Gateway 1326, where its format is converted to SCCP-User Adaptation Layer (SUA). Alternatively, the query can travel over Internet Protocol (IP) network 1325 from MSC 1321 through Edge SS7 Gateway 1316 to Application Processor-SCP 1330 using the SIGTRAN protocol.

The Application Processor acts as an Intelligent Networking Service Control Point (SCP) 1330. SCP 1330 queries the Database 1329 to determine how to handle the call. In some cases, for example if the managed TN is shared among multiple users, caller 101 is prompted to enter a digit to select the desired callee (or to select the callee by other means). To do this, SCP 1330 establishes a session and responds to MSC 1321, instructing it to temporarily connect the call to Application Processor-Intelligent Peripheral (IP) 1332 through VoiceXML gateway 1328 over PSTN or using VoIP.

When Application Processor-IP 1332 receives a call, it communicates with Application Processor-SCP 1330 over Internet Protocol 1331 to determine which voice prompt to play to caller 101. The response from SCP 1330 is used to select and retrieve the voice prompt from Prompt store 1333. That prompt is played to caller 101. Caller's 101 selection, made for example with the Dual Tone Multi-Frequency (DTMF) signal from a key press on a conventional telephone, is detected and forwarded to SCP 1330. Application processor-SCP 1330 uses the caller's selection to determine how to dispose of the call. Instructions for call disposition are sent to MSC 1321.

MSC 1321 disconnects the call to Application processor-IP 1332 and forwards the call to the desired delivery TN. Callee 109 can be notified of unanswered call events by the system. Desired call event information is sent from database 1329 to Notification Server 1334, which can notify callee 109 in various ways including sending an Short Message Service (SMS) message to callee's 109 mobile phone via SMS Gateway.

An enterprise telephone (station) attached to a Private Branch Exchange (PBX) 1336 can be managed by the system. When a call destined to a station is received by PBX 1336, PBX 1336 sends a query to Application Processor-SCP 1330 over Application Programming Interface (API) 1337. The response from the query instructs PBX 1336 as to how to dispose of the call.

Voicemail messages may be interchanged between Wireless Carrier Voicemail platform 1320 and Enterprise Voicemail platform 1335 using VPIM Gateway 1340.

In one embodiment, call routing (also referred to as vectoring) is accomplished by forwarding from destination switches 104 (connected to the originally dialed TN in a Central Office (CO) 104A or Mobile Switching Center (MSC) 104B or by forwarding from Private Branch Exchanges (PBX) 104C controlling dialed office telephones.

In one embodiment, Advanced Intelligent Network (AIN) technology is used in CO 104A. Advanced Intelligent Network (AIN) is a telephone network architecture that separates service logic from switching equipment, allowing new services to be added without having to redesign switches to support new services.

In another embodiment, Wireless Intelligent Network (WIN), Customized Applications for Mobile network Enhanced Logic (CAMEL), or other technology is used in MSC 104B to implement the call management functionality described herein.

Implementation by Integrating With a Wireless Carrier Using WIN or CAMEL

Figure 15:
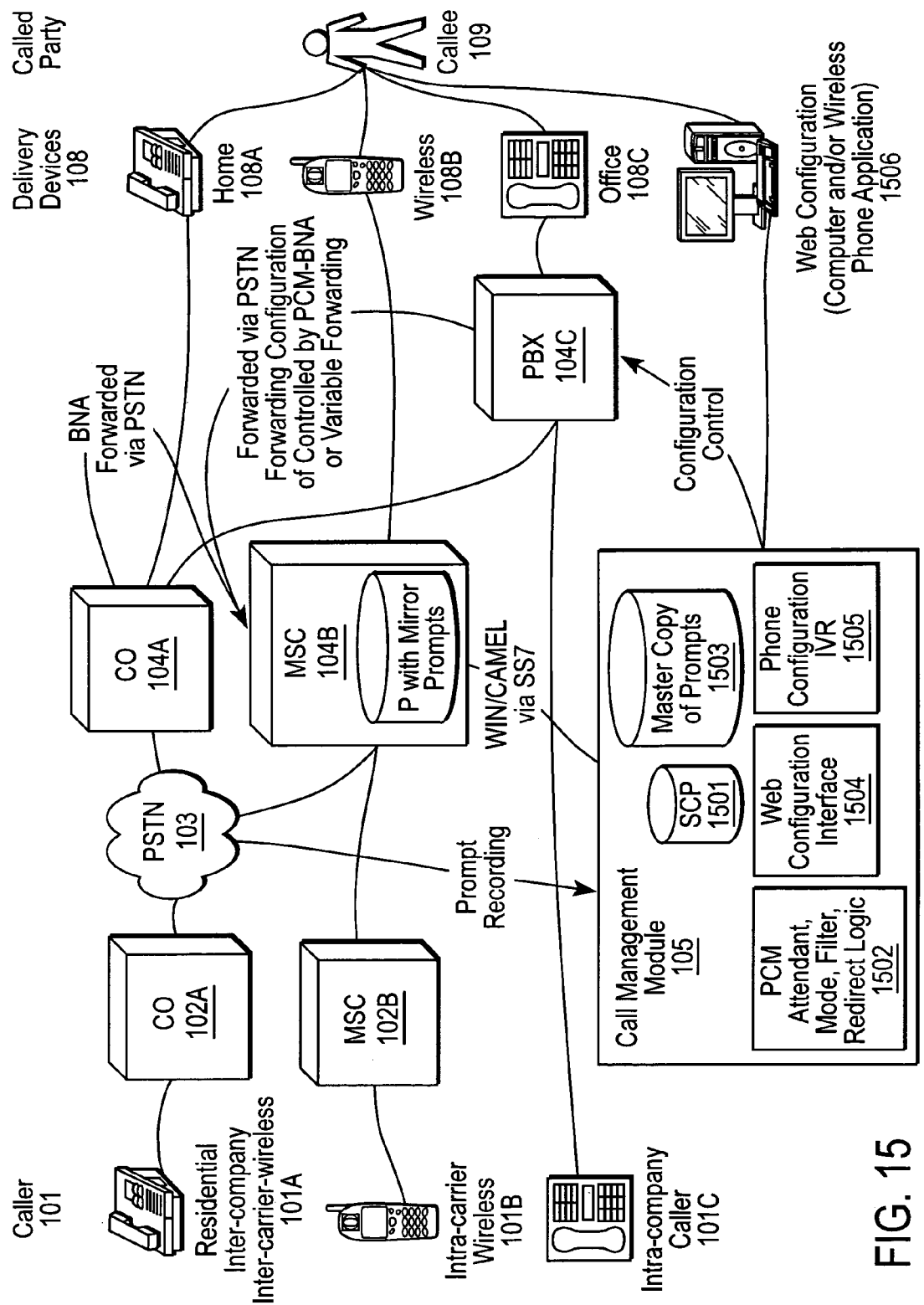
FIG. 15 is a block diagram depicting an architecture for implementing the present invention by integrating with a wireless carrier using WIN or CAMEL.

Referring now to FIG. 15, there is shown an example of an architecture for implementing the present invention by integrating with a wireless carrier using WIN or CAMEL.

The implementation shown in FIG. 15 manages landline, wireless, and office telephones using the wireless carrier Mobile Switching Center switch (MSC) 104B. Calls placed to Home phone 108A of callee 109 are initiated by any phone 101A, 101B, 101C and are routed over PSTN 103 to Central Office (CO) 104A associated with called home phone 108A. If Home phone 108A is busy or not answered, the call is forwarded to MSC 104B where the call is managed.

Likewise, calls placed directly to the callee's Wireless phone 108B are managed at MSC 104B.

Calls placed to the user's office phone 108C are managed by MSC 104B if the callee's public TN (published TN) is forwarded by PBX 104C to MSC 104B and Office phone 108C is associated with a hidden TN. In this fashion, calls destined to the callee's Office phone 108C arrive at MSC 104B where they can be managed and potentially forwarded to the actual office phone using the private TN.

Upon receipt of a call for a managed TN, MSC 104B queries SCP 1501 inside Call Management Module 105 using a WIN or CAMEL trigger over SS7. SCP 1501 in this figure includes a service database and database logic 102, which determines how the call should be handled by MSC 104B.

If the managed TN is shared by multiple users, a prompt is played to caller 101 so that caller 101 can select the callee he or she is trying to reach. The spoken name of each user is originally stored in the Master copy of prompts 1503 and periodically copied to a mirror data-store at MSC 104B. MSC 104B uses the local copy of the prompts to ask caller 101 to select a callee 109 (for example, "Press 1 for Joe. Press 2 for Mary," and the like). The selection is sent to SCP 1501, which replies to MSC 104B with instructions for completing the call. Depending on the instructions, MSC 104B may forward the call to the callee's Wireless phone 108B, Office phone 108C, or to a voicemail platform (not shown in FIG. 15), or the like. In this example, the call would not be forwarded to Home phone 108A because phone 108A is already known to be busy or not answered. The service database can be configured with a computer 1506 through a Website 1504 or through telephone Interactive Voice Response (IVR) system 1505.

The architecture of FIG. 15 is set up to provide the functionality of the present invention using one or more of the following steps:

Home phone 108A is provisioned to forward to cell phone TN on Busy or No-Answer. Alternatively, one or both of the following techniques can be used:

The wireless carrier can port, using wireline-to-wireless Local Number Portability (LNP), the existing home phone TN to itself, acting as a competitive local exchange carrier (CLEC), and then re-number the existing home phone line with a hidden physical TN. This allows Mobile Switching Center (MSC) 102B to intercept a call before it rings and to present an Interactive Voice Response (IVR) menu to the caller allowing the caller to select the household member (user) he or she is trying to reach. An option of "anyone" rings the home phone.

The wireless carrier can provide a new, virtual, TN on its network to be assigned as a proxy home TN for the callee's family. This TN works as in #1 above. Callees are then encouraged to give it out as their "home number."

Office phone 108C is provisioned in PBX 104C to forward to cell phone TN on Busy or No-Answer, or office phone forwarding (variable or BNA) can be dynamically configured based upon mode and/or filter.

Once the setup has occurred, calls are handled as follows:
Case 1—Caller Dials Cell Phone TN A switch in MSC 104B connects to cell phone 108B or redirects to another phone 108C, 108A or voicemail 106 based upon mode and filters.
Case 2—Caller Dials Home TN If the call is unanswered, it is forwarded to the cell phone switch. In the case of fixed forwarding or ported home number, all calls go to MSC 102B before ringing home phone 108A.

If home phone 108A is shared, a switch in MSC 102B can play attendant prompts to allow caller to select one of multiple users via IVR.

The switch in MSC 104B can connect to cell phone 108B or redirect to another phone 108A, 108C or voicemail 106 based upon mode and filters.
Case 3—Caller Dials Office TN If the call is unanswered, it is forwarded to the cell phone switch.

A switch in MSC 104B connects to cell phone 108B or redirect to another phone 108A, 108C or voicemail 106 based upon mode and filters.

Attendant prompts 1503, especially personalized greetings and names, may be recorded at a central site and distributed to each of the MSCs 102B through data mirroring. An SSP 1705 at MSC 104B can use an Intelligent Peripheral, located at MSC 104B or centrally, to play attendant prompts.

Integration With LEC Using AIN

In one embodiment, Advanced Intelligent Network (AIN) functionality at destination switch 104 can be used to perform filtering and/or play attendant prompts before ringing home phone 108A. When caller 101 selects the callee 109 he or she is trying to reach, the call can be forwarded to home phone 108A (possibly using distinctive ringing to identify the desired user), the call can be sent to another phone (including a cell phone 108B or office phone 108C), the call can be routed to a voicemail platform 106, or the call can be routed to another service. In one embodiment, callee 109 can specify filters that allow certain callers 101 skip the attendant or to be handled differently than other callers. Adding a caller 101 to a filter list can take place at any time, including after a call is completed, or before or during a conversation, or at any time using a configuration tool such as described above. In one embodiment, the web-based user interface displays a log of incoming callers, call times, the user the caller selected, along with the controls necessary to add/remove callers to/from filters.

Implementation Using Dynamic Number Portability

Figure 16:
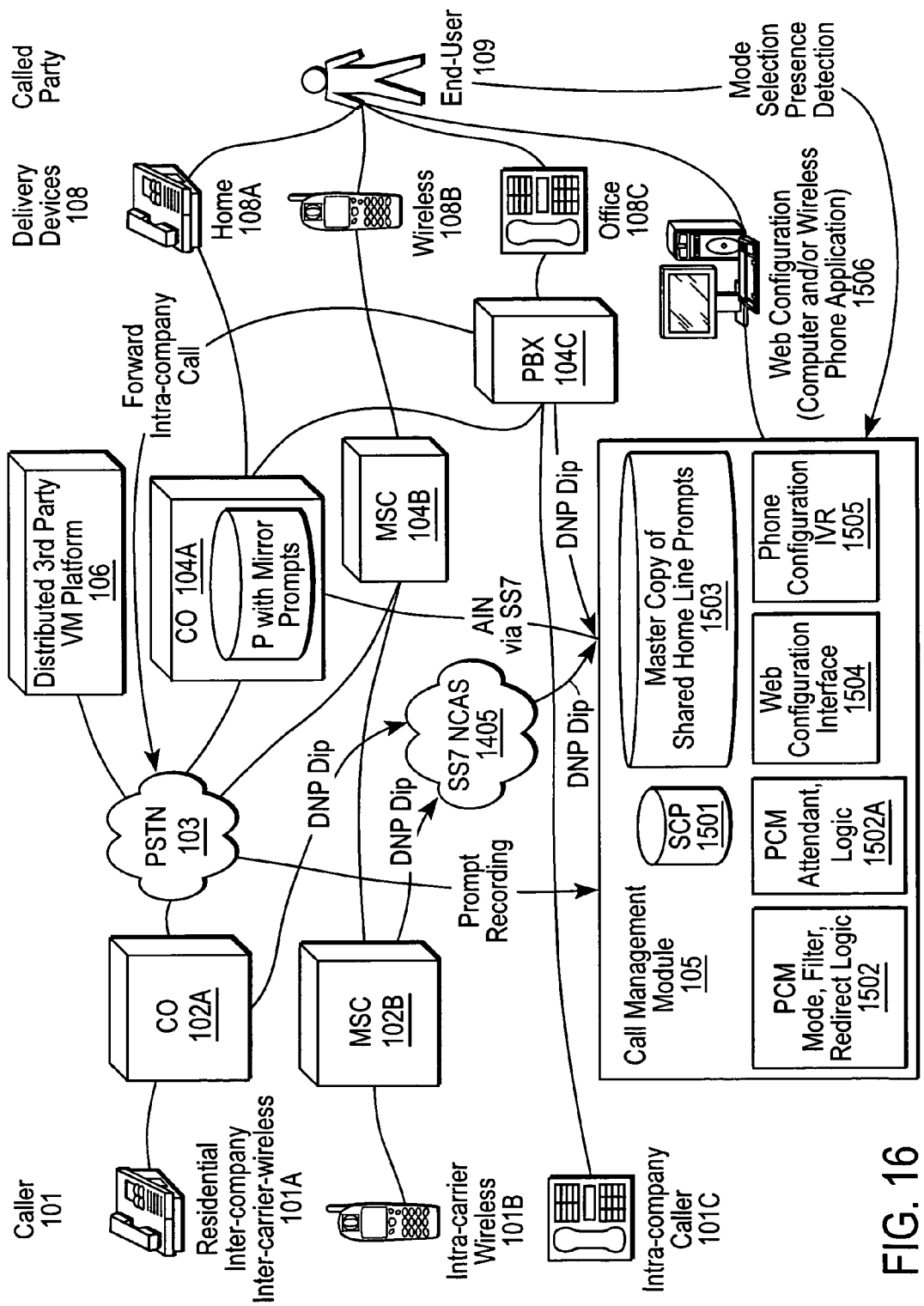
FIG. 16 is a block diagram depicting an architecture for implementing the present invention using DNP.

Referring now to FIG. 16, there is shown another embodiment of the present invention, wherein the functionality described above is implemented using Dynamic Number Portability (DNP), substituting the Alternate TN at the Origin and/or Gateway switch.

Caller 101 places a call on any of the following: a residential, inter-company or inter-carrier wireless phone 101A; an Intra-carrier wireless phone 101B; or an intra-company phone 101C. is Central office (CO) switch 102A is associated with phone 101A. Mobile switching center switch 102B is associated with phone 101B.

Public Switch Telephone Network (PSTN) 103 carries calls among CO switch 102A, Voicemail (VM) platform 106, and CO switch 104A. SS7 network 1405 carries Non Call path Associated Signaling (NCAS) between switch 102A or 102B and call management module 105.

Voicemail (VM) platform 106 is a potential destination for calls that is capable of recording caller's 101 voice message. CO switch 104A is a land-line central office switch associated with home (residential) telephone delivery device 108A. Mobile switching center (MSC) switch 104B is connected to wireless (mobile) telephone delivery device 108B. Private branch exchange (PBX) 104C is connected to an office telephone (station) 108C.

In one embodiment, callee 109 configures the service of the present invention, for example using a computer or wireless phone software application 1506. Examples of screen shots of such an application 1506 are shown in FIGS. 2-7 and 9-10.

In one embodiment, Call Management Module 105 includes Service Control Point (SCP) 1501 that accepts queries from switches 102A, 102B, 104A, and PBX 104C, and returns call routing information. PCM Mode, Filter and Redirect logic 1502 and PCM Attendant logic 1502A are software programs associated with SCP 1501.

Data store 1503 contains master copies of user spoken names for use in prompting caller 101 to select from multiple users who share a managed home telephone.

In one embodiment, web configuration interface 1504 generates the website with which callee 109 configures the service.

In one embodiment, callee 109 can use telephone Interactive Voice Response (IVR) server 1505 to configure services.

In one embodiment, call management is performed by doing a lookup at origin switch 102A or 102B (associated with caller's 101 telephone line 101A or 101B) or PBX 104C, for example using Dynamic Number Portability (DNP). Thus, the call is redirected before it leaves originating switch 102. An advantage of such an implementation is that it reduces system-wide telecom costs and eliminates potential calling loops that may take place if different systems (such as PBXs) control redirection for overlapping subsets of a user's phones.

DNP need not be implemented in all networks to be effective at reducing costs associated with re-routing calls to alternate telephone numbers.

In one embodiment, DNP is implemented using universal switch (CO and MSC) participation and/or PBX participation to redirect intra-company calls to a user's office phone. In one embodiment, DNP is also implemented at international gateway switches so that calls can be routed (vectored) when entering a particular service area.

In another embodiment, DNP is implemented at the call-originating device, for example when calls are transported without going thought telecom switches. Such a technique can also be used for devices that use PSTN 103. Such devices include a computer that places calls using IP telephony, a wireless carrier's cell phone, or a peer-to-peer switch-less cell phone. The call-originating device performs a DNP database dip to receive the substitute TN and other call control information, such as TN to call if the substitute TN is not answered.

When caller 101 dials a TN, switch 102A or 102B determines the dialed TN is a user TN (optional step). If so, then a DNP dip is performed passing Dialed TN and Calling Party TN, Calling Party Blocked CID Flag, and a switch identifier (for location determination used in some cases for substitute TN selection). Returned from the dip is Substitute Telephone Number (STN), Busy Telephone Number (BTN) No Answer Telephone Number (NATN), No-Answer Ring Count (or time delay), and billing entity number (which may be a switch ID of user).

Switch 102A or 102B calls the STN. If it is busy, the call is connected to BTN. If it is not answered after "No-Answer Ring Count" rings, the call is connected to NATN. The STN can be a delivery device (wireline or wireless phone) or another device such as an attendant IVR service.

In addition, destination switch 104A, 104B, or another destination switch for the delivery device may act as an attendant service. An attendant service can redirect the call, present caller 101 with options (such as attempt connection or go to voicemail, or allow caller 101 to select which callee he or she is calling from a list of options), or provide screening choices to callee 109. For example an attendant can call callee 109 and let him or her know who is on the phone, and present callee 109 with call completion options.

The use of BTN and NATN also allows LECs to pull back a call destined to a wireless carrier. In this way, they can allow their customers to have a single voicemail box, possibly on the LEC network. This scheme enables a "leave a message for a person, not for each of their places" service. DNP also enables a wireline carrier to allow its customer to hide a wireless TN behind a wireline TN.

Inclusion of BTN and NATN in the returned DNP information also allows the owner of origin switch 102A, 102B to provide a voice messaging option to their customers, the callers. Such a service could be implemented, for example, by dialing *11 or other prefix code or access TN before a 10-digit number. If callee 109 is a DNP user and has a BTN and NATN, then caller 101 is connected to voicemail directly. If BTN and NATN is not present, then the *11 service can connect the call directly or inform caller 101 that the voice messaging option is not available. This scheme enables a "leave a message for a person, without the risk of talking to them" service.

In one embodiment, a BTN and NATN returned in a DNP dip may differ depending on the switch making the dip. The DNP dip includes switch ID that can be mapped to location inside the DNP system. DNP can dynamically substitute local access numbers. This can be done, for example, to minimize the access charges in a voicemail network. In one embodiment, the BTN and NATN are not typically configured directly by the user. Instead, the user selects a third-party VM provider, and that provider supplies access numbers.

In one embodiment, attendant greetings are a function of filters and modes. For example, when caller 101 dials callee's 109 home TN, caller 101 might receive a different personalized greeting based upon callee's 109 current mode: "I'm commuting right now, please leave a message and I'll return your call when I reach my destination," or "I'm at work today, please press 1 to connect to my office phone."

Also, in one embodiment, modes and/or filters can be used to select ringing modes (loud, soft, vibrate, etc.) and/or ring tones ("Ring-ring, 'you have a call', etc.) on a cell phone or other phone, as described in more detail above.

The following is a set of operational steps that are used to implement the functionality of the present invention using DNP, according to one embodiment:

Case 1—Caller Dials a PSTN TN from Landline Phone (Connected to CO Switch) or Wireless Phone (Connected to MSC Switch)

Origin switch, optionally, determines if the TN is managed by DNP. In one embodiment, this information is pushed from a database (not shown) within SCP 1501 to the carrier periodically. In one embodiment, if this data is pushed to the carrier, the carrier uses an in-network SCP with an affiliated database (mirror of the data within SCP 1501) to query for call routing information. This step minimizes out-of-network SS7 traffic. This check to see if a user has DNP can be performed on an in-network LEC or wireless carrier database that is anticipated periodically, for example every 15 minutes. In one embodiment, if the user has DNP service, a DNP dip to a DNP database is done to get current data.

If the TN is managed by DNP, or if previous step was not performed, a DNP dip is performed, typically using Transaction Capabilities Application Part (TCAP) messaging carried on Signaling System 7 (SS7) 1405. In one embodiment, the following information is passed to DNP database, for example via TCAP message from switch 102A or 102B to Service Control Point (SCP) 1501:

Dialed TN
Calling Party TN
Calling Party Blocked CID Flag (to suppress number display during notifications)
Switch ID In one embodiment, the following information is returned from DNP database, for example via TCAP message from SCP 1501 to SSP:

Substitute TN (may be the same as Dialed TN)
Optional: BTN
Optional NATN, NA Ring Count or time delay
User Billing Proxy ID (May be user carrier or switch information)

Case 2—Caller Dials an Intra-PBX Call Using TN or Extension

Using TN/Extension, a DNP dip is performed, for example using XML over HTTP. In one embodiment, the following information is passed to DNP database:

Dialed TN/Extension
Calling Party TN/Extension
Calling Party Blocked CID Flag
PBX ID
In one embodiment, the following information is returned from DNP database:
Substitute TN/Extension (may be same as Dialed TN/Extension)
Optional: BTN/Extension
Optional: NATN/Extension, NA Ring Count or time delay
Local Call flag (Used to create usage bill)
Department Billing ID In one embodiment, DNP is implemented with a master database and a distributed network of mirrored databases in multiple geographically disparate locations. When a DNP dip is performed over SS7 network 1405, Global Title Translation (GTT) is used to find the active or best database (SCP 1501) to query. SS7 network 1405 may be provided by a third party.

In one embodiment, DNP dips are only performed for dialed TNs of users of the DNP service. A pre-qualification database may be hosted by the LEC within its own network. Such an implementation causes DNP dip traffic to grow gracefully over time. In the event of a system failure, the default action is to complete the call to the original dialed number, if possible. The pre-qualification database may be updated at a frequency much lower than the update of the active DNP databases.

In-Network and Out-of-Network Routing

The present invention can be implemented in many different architectures, and can operate regardless of whether call routing takes place at the origin switch or the destination switch, or at a gateway switch. Thus, in one embodiment, call routing takes place at an origin switch. Alternatively, call routing can take place at any other switch along the call path. In one embodiment, multiple routings can take place at different points along the call path. A DNP dip can be made at any point in order to obtain information for the call routing operation. In one embodiment, multiple DNP dips may occur, as requested by multiple switches. In another embodiment, a flag may be set to indicate that a DNP dip has already occurred for the call, so that additional unnecessary dips can be avoided.

Figure 20:
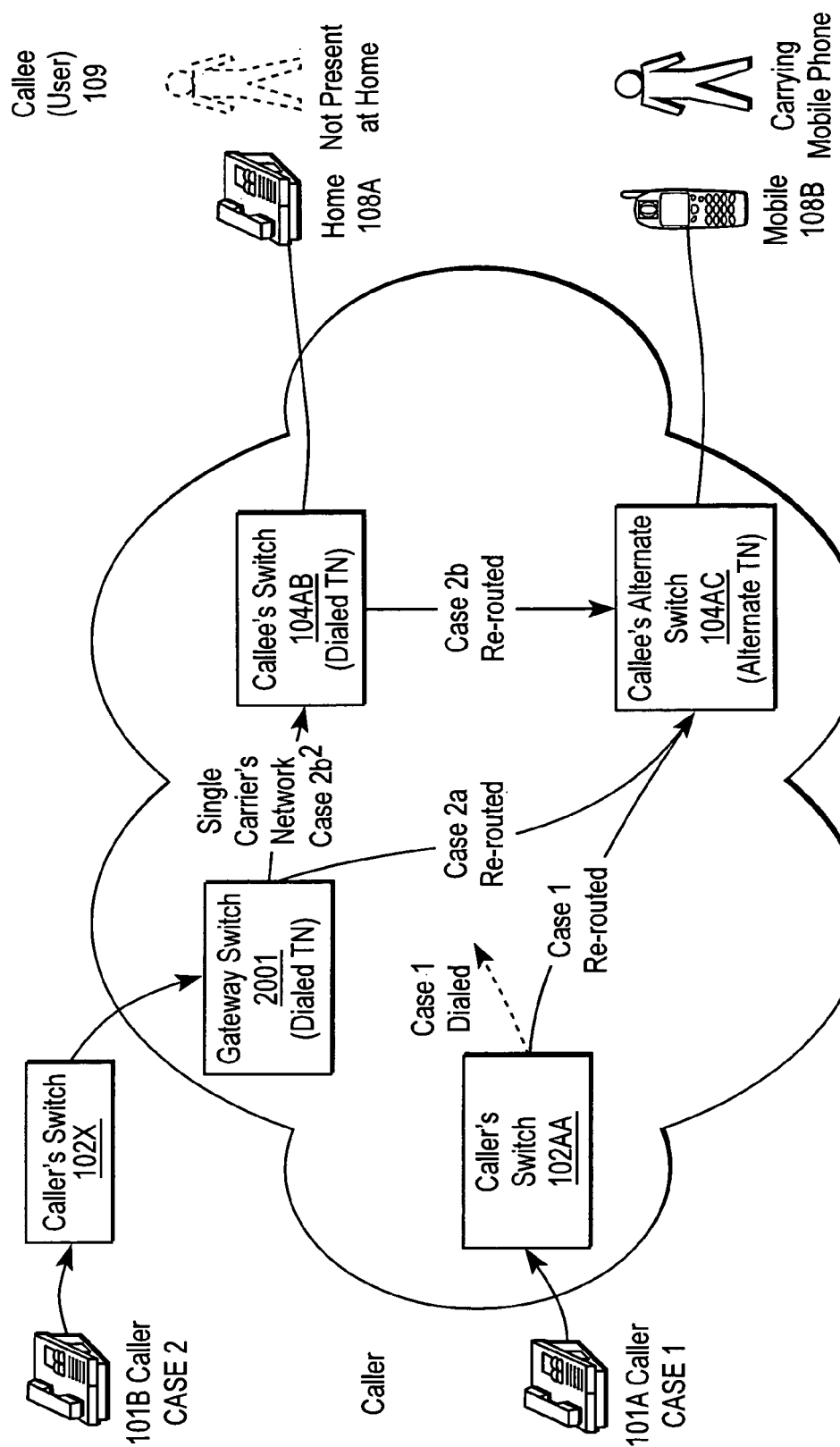
FIG. 20 is a block diagram depicting an architecture for in-network and out-of-network call routing using an implementation of the present invention.

Referring now to FIG. 20, there is shown an example of an architecture for in-network and out-of-network call routing using an implementation of the present invention. Two cases are contrasted:

Case 1—In Network Caller.

When caller 101A belonging to network 2002 dials callee 109 at dialed TN 108A (handled by switch 104AB), origin switch 102AA re-routes the call to Alternate TN 108B via switch 104AC.

Case 2a—Out of Network Caller.

When caller 101B not belonging to network 2002 dials callee 109 at dialed TN 108A, gateway switch 2001 re-routes the call to Alternate TN 108B via switch 104AC.

Case 2b—Out of Network Caller.

When caller 101B not belonging to network 2002 dials callee 109 at dialed TN 108A, if gateway switch 2001, or any other switch, does not re-route the call, callee's destination switch 104AC can e-route the call to the Alternate TN 108B.

DNP Billing

With DNP, origin switch 102 forwards calls on behalf of caller 101. Callee 109 is not necessarily a customer of the owner of origin switch 102. Thus, in one embodiment the present invention uses DNP and includes a charge transfer sub-system.

According to this embodiment, billing records are moved from origin switch 102 to an entity, which can bill the customer. The billing record can be forwarded to the switch of the dialed number. Callee should be charged the cost as if the call was forwarded from the switch associated with the originally dialed TN to the forwarded number.

The following table sets forth a billing paradigm according to one embodiment:

| Dialed TN | Delivery TN | | Outcome |
|---|---|---|---|
| Local (No need to transfer charge) | Local | | Caller not charged, User not charged |
| Local (Charge sent to User) | LD | | Caller not charged, User charged |
| LD | Local | | Caller charged, User not charged |
| LD | LD | case Dialed-> Substitute is local | Caller charged; User not charged |
| LD | LD | case Dialed-> Substitute is LD | Caller charged; User charged |

Emergency/Disaster Number Redirection

In one embodiment, the present invention provides automatic and/or preconfigured redirection of telephone calls in case of emergency or disaster.

In the event a disaster, such as an earthquake, destroys one or more of the user's delivery devices or makes them unavailable to the user, the user may use screen 300 to cause their calls to be routed to an out-of-area delivery device (telephone). If desired, an "Emergency" mode may be predefined for this purpose. In one embodiment, the "Emergency" mode is automatically selected if the system of the present invention detects, or is informed, that a set of telephone numbers is no longer reachable.

If damage to a telephone switch causes the system to be unable to route calls destined for managed telephone numbers handled by the switch, in one embodiment queries are performed by the origin switch, rather than the destination switch. In one embodiment, origin switch-based redirection is performed at all times, rather than just during unusual situations. In one embodiment, the system detects switch failure for a set of managed telephone numbers attached to a switch by monitoring the health of the switch, for example by querying the switch on a regular basis. If there is no response, the switch is presumed to be unavailable and all users with managed telephone numbers attached to that switch are automatically placed into the "Emergency" mode.

DNP can be used to creating a disaster resilient phone network. In the event phone service is lost in a region (from one phone line, to a building, to a city), calls destined into that region can be rapidly rerouted to alternate locations. A disaster recovery service can be pre-configured according to the techniques of the present invention that when the customer signals that a disaster occurred (or when such a condition is detected by other means), all managed TNs are routed (vectored) to the corresponding substitute TNs.

Figure 18:
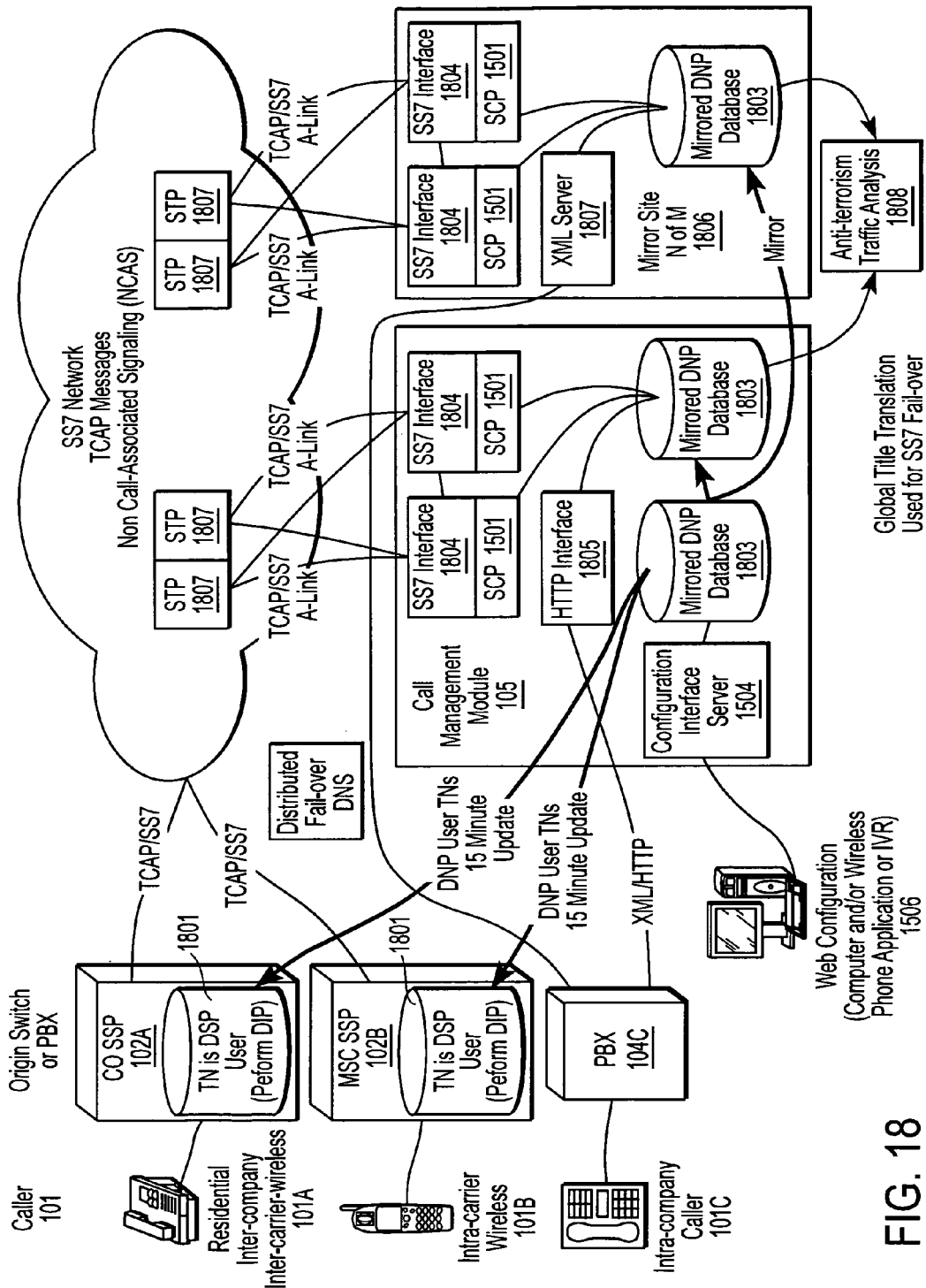
FIG. 18 is a block diagram depicting an architecture for implementing a disaster-resilient DNP architecture according to one embodiment of the present invention.

Referring now to FIG. 18, there is shown a block diagram depicting an architecture for implementing a disaster-resilient DNP architecture according to one embodiment of the present invention.

Mirror copies 1801 of Master DNP Database 1802 are provided. A backup set 1806 of Call Management servers are located at a geographically dispersed location. Switches 102A and 102B can either contain a mirror copy 1801 of DNP database 1802 to be dipped locally, or they can dip a DNP database outside the carrier's network using TCAP messages over SS7 network 1405.

These queries and the responses typically travel through one or more Service Transfer Points 1807. In one embodiment, STPs 1807 are implemented in cross-connected pairs for high reliability paired with SS7 Interfaces 1804.

Service Control Point 1501 (also implemented in redundant pairs) dips locally mirrored copy 1803 of DNP database 1802. This database dip can be performed on primary Call Management module 105 or on a backup set of Call Management servers, referred to as mirror 1806. Any number of mirrors 1806 can be provided.

PBX 104C dips DNP database 1802, or mirror database 1803, using HTTP over IP through HTTP Interface 1805.

Traffic analyzer 1808 collects usage information from each DNP database 1802, 1803 for traffic pattern analysis.

Configuration Interface Server 1504 is implemented, for example, as a web server that hosts a website that allows callee 109 to configure his or her service using computer 1506.

In addition, DNP can be used to facilitate traffic analysis in order to identify terrorist human-networks through calling patterns of known or suspected terrorist or other enemies of the state. With the addition of location information on a per-call basis (or periodic update) coordinated attacks can be detected in real-time by looking for suspicious, predefined usage pattern. Referring again to FIG. 18, a traffic analysis component 1808 could look for suspicious patterns of telephone usage. For example, component 1808 could look for multiple calls to multiple airport gates (2 linked calls from 3 airport gates) within a given time period. If this event is detected, an alert can be forwarded to the appropriate governmental agency.

Shared Phone Lines

In many households, the home TN is shared among multiple residents. In one embodiment, if caller 101 calls a callee's 109 shared home phone 108A, caller 101 is presented with a choice of which resident they would like to contact. This choice may be given before the phone rings or alternatively, only if the phone is unanswered (busy or no-answer). The call may be redirected (per filters, profile parameters, settings, and mode) after caller 101 makes a selection.

In another implementation, each user who shares a home phone line has his or her own personal telephone number (PTN). This PTN may be a permanent TN given to a callee 109, or it can be temporary. A set of such PTNs is configured to all point to the same home phone line 108A.

Without DNP, each of these aliased TNs rings the same phone line. Such a personal TN can be used by a person wherever they reside, within the DNP service area.

With DNP, callee 109 can decide if calls to his or her personal TN ring the common home line 108A or another phone line (cell phone 108B, office phone 108C, dorm phone, vacation home phone, or the like). In this implementation, callee 109 may have a lifetime TN that will always reach them as long as they are within the area served by DNP (for example, the area served by the North American Numbering Plan). An additional TN may be dedicated to the location of a phone line. For example, caller 101 could dial PTN-1 for a user X, PTN-2 for user Y, or TN-3 for the residential phone line (home) of X and Y. This location TN would typically be given out for location-based services such as pizza delivery.

Information for filters based on calling TN can be extracted (batch or real-time) from the callee's 109 address book. This address book may be stored on the user's computer, a different server (such as a Microsoft Exchange server), or a web-based address book.

Further DNP Notes

DNP allows third-party companies to offer application services to customers involving the control of common-carrier voice devices.

Security

In one embodiment, Substitute TNs (STN) (Delivery TNs) are authenticated before they can be selected for use, so as to minimize the risk of someone hijacking the calls of a user 109. In one embodiment, this authentication process consists of the user logging in using web browser or phone IVR and entering the new number to be added to his or her palette of substitute telephone numbers (STN). The user is given an authentication key (such as a numeric sequence); the user then calls a special access number (such as a toll-free number). In one embodiment, the user must make this call from the STN to be added, so that the user's ownership of (or access to) the STN can be verified via caller ID. The user keys in the authentication key. Once a number is authenticated, the user can change his or her personal configuration to redirect to it at will. This process is used to populate a palette of delivery TNs available as destinations for call routing.

ENUM

In one embodiment, the STN or BTN or NATN returned from a DNP dip can be in turn used to dip an Electronic Numbering (ENUM) database to determine further user contact options including e-mail address for voicemail/voice message delivery.

Notification

In one embodiment, a Dialed TN is dipped through the DNP database, a notification message may be sent to the owner of the TN. This message can be delivered via SMS, e-mail, Instant Message (IM), or the like. This message can contain any or all of: the number called (Dialed TN), the caller's TN, the caller's name [using Caller Name (CNAM) service], location from which the call was placed or other caller mode information, and the like. In one embodiment, a notification can be sent even if the call is not completed.

Notification may be sent to any device, even if it is not associated with the call management system of the present invention. Notification may also be sent to a Delivery Device, whether or not the Dialed TN or STN addresses the Delivery Device. If the "Calling Party Blocked CID Flag" indicates the Calling Party TN is blocked, in one embodiment it is not sent in the notification (pursuant to applicable regulation).

Prioritization Based on Filters

As described above, in the present invention calls are routed based on various types of information, parameters, and preferences. One such parameter is "filters"; in other words, calls from some callers are allowed through, while calls from other callers are routed to voicemail (or the like).

In one embodiment, such filters are also used for prioritization of calls. For example, while in a commuting mode, a filter that determines a caller is "Friends and Family" might cause the call to connect to the user's cell phone; other calls might be routed to voicemail. A "Telemarketer" filter may cause calls to be terminated with a polite, personalized, "no thank you" message.

In such a case the "Telemarketer" filter would be looking for calls with masked caller ID or with suppressed Automatic Number Identification (ANI). In an implementation that can distinguish between suppressed ANI and blocked caller ID, a blocked caller ID call may be from a caller the user desires to talk to. That call can be marked, ex post facto, as being in an "allowed" filter even if the caller ID is never revealed to the user. In other words, the system knows the Calling Party TN and can match it up with user characterizations without revealing the Calling Party TN to the User.

In some states, the storage of called party number for a caller with blocked caller ID may be prohibited. One technique of allowing filtering in such cases is to use a trap-door encryption algorithm as a hash function for matching. In this way, any information stored could not be converted back to the TN of a caller with a blocked caller ID and would therefore comply with legal restrictions. Only one-way encrypted data would be stored and matched. An alternate "Telemarketer" filter would filter out callers with caller IDs of toll free TN (800, 866, etc), which are commonly used by telemarketers.

The system may also determine if a call is a telemarketing call by looking at the pattern of calls placed by the caller. If the caller has placed a large number of calls to other users (or non-users) within a short period of time, especially if the calls are to sequential TN, that caller could be deemed a telemarketer. Another way to classify a caller as a telemarketer is by accepting input from users. If multiple users report telemarketing calls from a caller, then the system would record that fact to maintain a blacklist. Input from users could be received from a cell phone. A cumulative database of telemarketers' TN or names can be used as a blacklist or "spam list."

DNP facilitates a personal, long-term TN that a user can point to any delivery TN. This TN can be retained as a user moves his or her residence throughout the numbering plan region. Thus DNP obviates the need for LNP.

Additional Variations and Features

Voicemail in a Client-Based App With Message Stores in the Network

In one embodiment, when a client device, such as cell phone, detects a busy or no-answer condition while attempting to place a call, the device records the voicemail message and forwards it to the callee's voicemail platform or directly to the callee's client device.

Voicemail messages can be sent peer-to-peer and eliminate any (or most) voicemail infrastructure in the network. When a client device detects a busy or no-answer condition, a voicemail-control-exchange database can be queried for the spoken name and greeting of the callee and for the store-and-forward addressing information necessary to deliver the message to the callee's client. When the callee's client device is no longer busy (call terminates or device is turned on), it registers with the same database so the store-and-forward network can deliver the voicemail message. Voicemail messages recorded by the client can optionally be delivered to the user via email, IM, or MMS. Voicemail stores can be distributed in the network in a fashion similar to architecture conventionally used for e-mail message stores.

Conclusion

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

What is claimed is:

1. A method comprising:
receiving, by a first system, a request transmitted by a second system, wherein the request is to retrieve instructions for routing a call placed by a first user at a first terminal to a telephone number of a second terminal associated with a second user;
identifying, by the first system, in response to receiving the request, a mode that is currently enabled for the second user, wherein the mode comprises a plurality of instructions for routing calls that are placed to a particular telephone number of the second user;
selecting, by the first system, a first instruction from the plurality of instructions based on:
(i) the second user's current geo-location, and
(ii) past behaviors of the second user at the current geo-location; and
transmitting, by the first system, the first instruction to the second system, wherein the first instruction:
(i) routes the call to a third system, and
(ii) transmits a message to the second user at a third terminal, wherein the message comprises information on how the call was routed.

2. The method of claim 1 wherein the request transmitted by the second system comprises an identifier of the first terminal; and
wherein selecting the first instruction from the plurality of instructions is also based on the identifier of the first terminal.

3. The method of claim 1 wherein the request transmitted by the second system comprises an identifier of the first user; and
wherein selecting the first instruction from the plurality of instructions is also based on the identifier of the first user.

4. The method of claim 1 wherein the request transmitted by the second system comprises a geo-location of the first terminal; and
wherein selecting the first instruction from the plurality of instructions is also based on the geo-location of the first user.

5. The method of claim 1 wherein the request transmitted by the second system comprises an environmental condition at a geo-location of the first user; and
wherein selecting the first instruction from the plurality of instructions is also based on the environmental condition at the geo-location of the first user.

6. The method of claim 1 wherein the request transmitted by the second system comprises the telephone number of the second terminal; and
wherein selecting the first instruction from the plurality of instructions is also based on the telephone number of the second terminal.

7. The method of claim 1 wherein identifying the mode that is currently enabled for the second user further comprises the task of:
identifying, by the first system, that the first user is a member of a first group and not a member of a second group, wherein members in the first group and the second group are pre-defined by the second user.

8. The method of claim 7
wherein selecting the first instruction from the plurality of instructions is also based on identifying that the first user is a member of a first group and not a member of a second group.

9. The method of claim 1 wherein the mode is automatically enabled based on a temporal schedule that is established by the second user.

10. The method of claim 9 wherein the mode is automatically enabled between a time interval $[T_1, T_2]$ based on the temporal schedule, and wherein $T_1 < T_2$.

11. The method of claim 1 wherein the mode is enabled based on receiving an input from the second user.

12. The method of claim 1 wherein the mode is automatically enabled by the first system based on at least one of:
(i) time of day, and
(ii) day of week.

13. The method of claim 1 wherein the mode is automatically enabled by the first system based on the current geo-location of the second user; and
wherein the current geo-location of the second user is determined based on a Global Position System (GPS).

14. The method of claim 1 wherein the mode is automatically enabled by the first system based on
whether a particular terminal has been used by the second user.

15. The method of claim 1 wherein the mode that is currently enabled for the second user expires after a time interval $[T_1, T_2]$, wherein $T_1 < T_2$; and
wherein the first system enables a default mode for the second user after the current mode expires.

16. The method of claim 1 wherein the message further comprises:
(i) an identifier of the first user,
(ii) an identifier of the first terminal, and
(iii) a geo-location of the first user; and
wherein the message is at least one of a short message service (SMS), an instant message, and an e-mail.

17. The method of claim 1
wherein the call routed to the third system is stored as a voicemail by the third system; and
wherein the third system is configured to convert the voicemail into at least one of a short message service (SMS), an instant message, and an e-mail for transmission to the second user.

18. The method of claim 1
wherein the call routed to the third system is stored as a voicemail by the third system; and
wherein the third system is configured to append the voicemail to at least one of a short message service (SMS), an instant message, and an e-mail for transmission to the second user.

19. The method of claim 1 wherein the first system is in a first network and the second system is in a second network; and
wherein the first network is different from the second network.

20. The method of claim 19 wherein the first network is a Local Exchange Carrier and the second network is a wireless carrier.

21. A method comprising:
receiving, by a first system, a request transmitted by a second system, wherein the request is to retrieve instructions for routing a call placed by a first user at a first terminal to a second user at a second terminal;
identifying, by the first system, in response to receiving the request:

(i) past behaviors of the second user at a current geo-location of the second terminal, and
(ii) a former geo-location of the second terminal, wherein the former geo-location is different from the current geo-location of the second terminal;

selecting, by the first system, a first instruction from a plurality of instructions established for routing calls that are placed to the former geo-location, wherein the first instruction is selected based on identifying the past behaviors and that both of the current geo-location and the former geo-location of the second terminal are classified in similar classifications; and transmitting, by the first system, the first instruction to the second system, wherein the first instruction:
(i) routes the call to a third system, and
(ii) transmits a message to the second terminal, wherein the message comprises information on how the call was routed.

22. The method of claim 21
wherein the call routed to the third system is stored as a voicemail by the third system; and
wherein the third system is configured to convert the voicemail into at least one of a short message service (SMS), an instant message, and an e-mail for transmission to the second user.

23. The method of claim 22
wherein the request transmitted by the second system comprises an identifier of the first terminal; and
wherein selecting the first instruction from the plurality of instructions is also based on the identifier of the first terminal.

24. The method of claim 22
wherein the request transmitted by the second system comprises an identifier of the first user; and
wherein selecting the first instruction from the plurality of instructions is also based on the identifier of the first user.

25. The method of claim 22
wherein the request transmitted by the second system comprises a current geo-location of the first terminal; and
wherein selecting the first instruction from the plurality of instructions is also based on the current geo-location of the first terminal.

26. The method of claim 22
wherein the request transmitted by the second system comprises an environmental condition at a current geo-location of the first terminal; and
wherein selecting the first instruction from the plurality of instructions is also based on the environmental condition at the current geo-location of the first terminal.

27. The method of claim 22
wherein the request transmitted by the second system comprises a telephone number of the second terminal; and
wherein selecting the first instruction from the plurality of instructions is also based on the telephone number of the second terminal.

28. The method of claim 21 wherein the first system is in a first network and the second system is in a second network, and wherein the first network is different from the second network.

29. The method of claim 28 wherein the first network is a Local Exchange Carrier and the second network is a wireless carrier.

30. The method of claim 21 wherein the call is placed by the first user at the first terminal to an address that is a non-North American Numbering Plan (NANP), and wherein the address is an e-mail address of the second user.

31. The method of claim 21
wherein the message is a short message service (SMS), and wherein the short message service message comprises:
(i) an identifier of the first user,
(ii) an identifier of the first terminal,
(iii) a current geo-location of the first terminal, and
(iv) information on how the call was routed by the first system.

32. The method of claim 21
wherein the message is an instant message, and wherein the instant message comprises:
(i) an identifier of the first user,
(ii) an identifier of the first terminal,
(iii) a current geo-location of the first terminal, and
(iv) information on how the call was routed by the first system.

33. The method of claim 21
wherein the message is an e-mail, and wherein the e-mail comprises:
(i) an identifier of the first user,
(ii) an identifier of the first terminal,
(iii) a current geo-location of the first terminal, and
(iv) information on how the call was routed by the first system.

* * * * *